United States Patent [19]

Dwyer, III

[11] Patent Number: 4,924,254
[45] Date of Patent: May 8, 1990

[54] FILM PRINTING/READING SYSTEM

[75] Inventor: Eugene J. Dwyer, III, New York, N.Y.

[73] Assignee: Silhouette Technology, Inc., Morristown, N.J.

[21] Appl. No.: 347,247

[22] Filed: May 4, 1989

Related U.S. Application Data

[63] Continuation-in-part of Ser. No. 54,294, May 26, 1987, Pat. No. 4,829,339.

[51] Int. Cl.$^5$ .................. G03B 27/72; G03B 27/80
[52] U.S. Cl. .................................... 355/20; 355/81; 358/51
[58] Field of Search .................. 355/20, 81; 358/51

[56] References Cited

U.S. PATENT DOCUMENTS

| | | |
|---|---|---|
| 2,985,064 | 5/1961 | Dimmick . |
| 3,027,219 | 3/1962 | Bradley . |
| 3,115,807 | 12/1963 | Craig et al. ............... 355/20 |
| 3,145,368 | 8/1964 | Hoover . |
| 3,183,766 | 5/1965 | Takasaka et al. ............... 355/20 |
| 3,191,157 | 6/1965 | Parker et al. . |
| 3,404,220 | 10/1968 | Favreau ............... 358/51 |
| 3,508,245 | 4/1970 | Purdy et al. . |
| 3,703,135 | 11/1972 | Lang . |
| 3,721,965 | 3/1975 | Morgan-Voyce . |
| 3,809,888 | 5/1974 | Stock et al. . |
| 3,819,854 | 6/1974 | Kolb . |
| 3,852,782 | 12/1974 | Gundlach et al. . |
| 3,866,199 | 2/1975 | Eberhard et al. . |
| 3,885,096 | 5/1975 | Inuiya . |
| 3,898,005 | 8/1975 | Roberts . |
| 4,084,894 | 4/1978 | Yoshino . |
| 4,088,401 | 5/1978 | Rees et al. . |
| 4,115,002 | 9/1978 | Clark . |
| 4,141,642 | 2/1979 | Nagai et al. . |
| 4,240,729 | 12/1980 | Barney . |
| 4,265,532 | 5/1981 | McIntosh ............... 355/20 |
| 4,319,281 | 3/1982 | Gall et al. . |
| 4,371,259 | 2/1983 | Howitt . |
| 4,433,345 | 2/1984 | Haddick et al. . |
| 4,457,618 | 7/1984 | Plummer ............... 355/20 |
| 4,457,626 | 7/1984 | Idesawa et al. . |
| 4,473,294 | 9/1984 | Iimori . |
| 4,588,287 | 5/1986 | Spinelli . |
| 4,630,115 | 12/1986 | Hilsum . |
| 4,666,307 | 5/1987 | Matsumoto et al. . |
| 4,719,488 | 1/1988 | Setani et al. . |

Primary Examiner—Monroe H. Hayes
Attorney, Agent, or Firm—Antonelli, Terry, Stout & Kraus

[57]  ABSTRACT

An apparatus for recording an image onto a light recording medium (16) by sequentially recording a plurality of sections onto the light recording medium includes a light source (120) which emits light at a position which is movable over a light emitting area (21) of the light source controlled by a controller (13), the position of the light being subject to deviation from a desired position of the light emitting area of the light source which corresponds to a position to be recorded on the recording medium which has recording position coordinates; a translator (702) having controllable positions for moving the recording medium relative to a light source during the recording of the plurality of sections of the image; a light transmitting mechanism (14, 15) disposed between the light source and the recording medium for transmitting the light from the light source to the recording medium; a light position sensor (142) having a target area optically coupled to light emitted from a plurality of positions within the light emitting area of the light source used for recording for detecting the position of the light intersecting the target area of the sensor from the light emitting area of the light source and generating a signel dependent upon the light intersecting the target area; and wherein the controller, responsive to the signal, produces a correction parameter and sequentially controls the recording of the sections to record the image by controlling the position of the light on the light emitting area of the light source.

44 Claims, 17 Drawing Sheets

FIG. 4 x'=a(0)+a(1)*x+ a(2)*y+a(3)*x*y+a(4)*x*x+a(5)*y*y+a(6)*x*r+a(7)*y*r
y'=b(0)+b(1)*x+b(2)*y+b(3)*x*y+b(4)*x*x+b(5)*y*y+b(6)*x*r+b(7)*y*r

WHERE:    r = sqrt ( x*x + y*y )

(x', y') = CRT COORDINATES OR CRT DEFLECTION COMMANDS (x , y ) = FILM COORDINATES

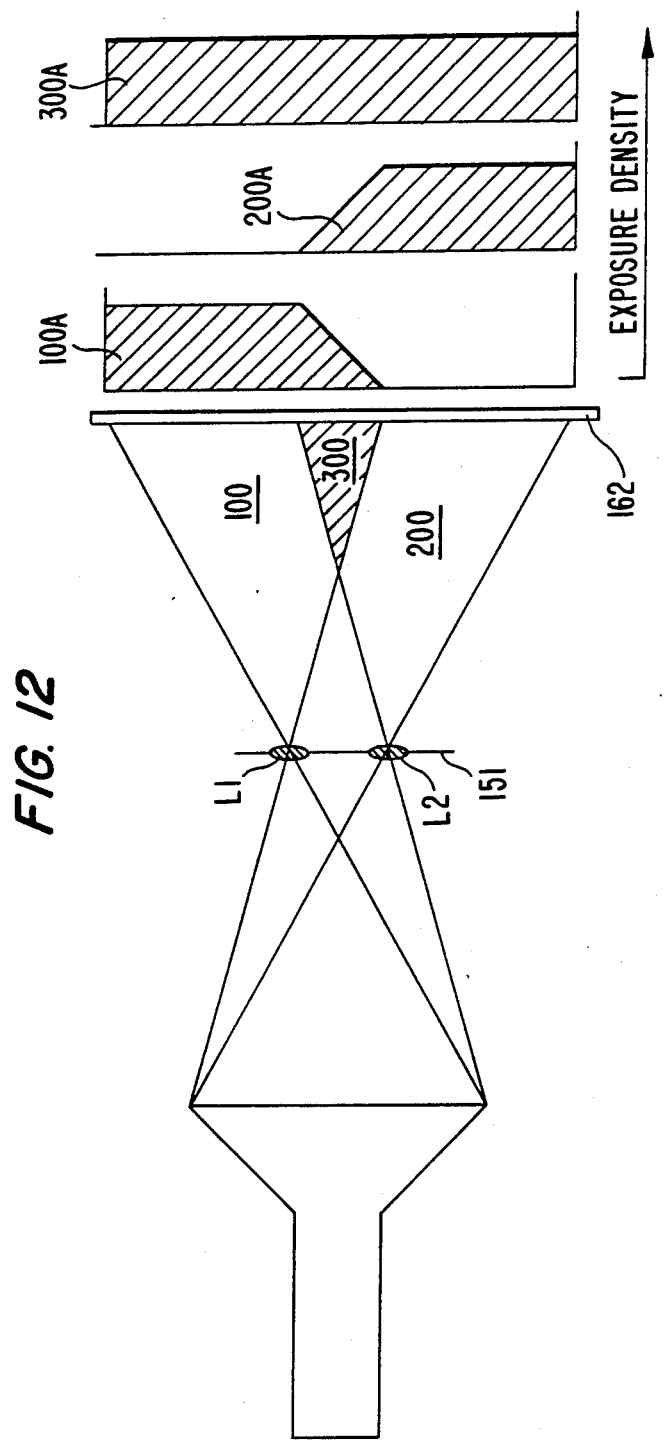

FIG. 14(A) FIG. 14(B)
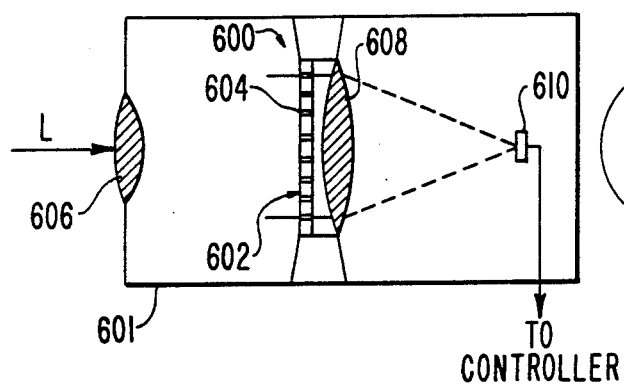 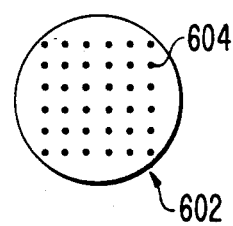
FIG. 15
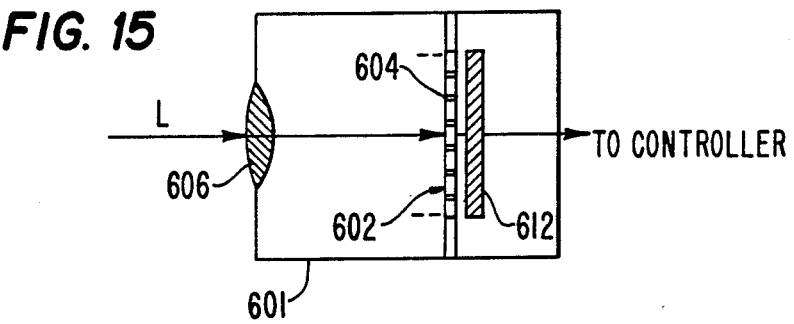
FIG. 16
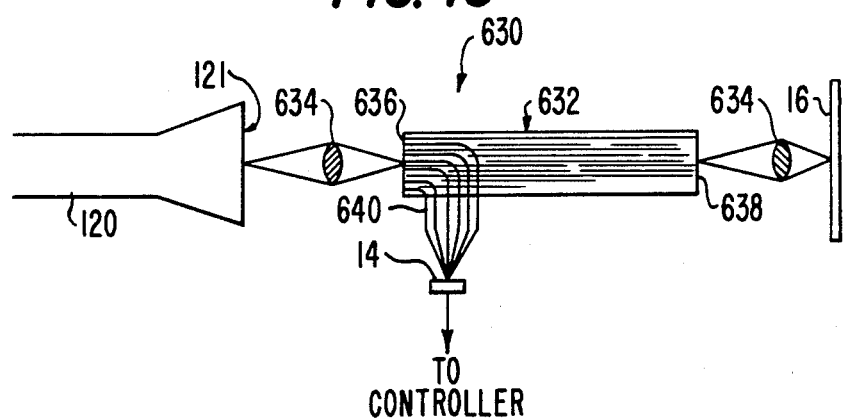

FILM PRINTING/READING SYSTEM

CROSS REFERENCE TO RELATED APPLICATION

This application is a continuation-in-part of U.S. patent application Ser. No. 054,294, now U.S. Pat. No. 4,829,339, entitled Film Printing/Reading System filed on May 26, 1987 which application is incorporated herein by reference in its entirety.

TECHNICAL FIELD

This invention relates to a method of, and a photographic system for, exposing a recording medium to a light image. More specifically, the invention relates to a system which prints computer generated, or computer stored images or information or to a light sensitive recording medium such as but not limited to film while maintaining a high resolution and geometric accuracy in the recorded (printed) image. The system also provides the capability to read or digitize film-based imagery or information with the same high resolution and geometric accuracy.

BACKGROUND ART

In general, most commercial film printers consist of a cathode ray tube (CRT), a lens, a film holder, and related drive/control electronics. An image displayed or drawn on the CRT faceplate is projected by the lens onto the film surface, and is thereby printed. Color images are frequently printed by decomposing the original image into three primary color frames and sequentially printed each frame through an appropriate color filter onto a single piece of recording media.

Other image characteristics, such as shading information, may be incorporated into the final printed image. U.S. Pat. No. 3,852,782, issued Dec. 3, 1974 to Gundlach et al., describes an imaging system wherein the light in contiguous sections of an image is differentially attenuated and focused through a selected one of adjacent lenticules onto contiguous segments of a photoreceptor. This provides for the recording of highlights, medium tones, or shadows in the image produced on the photoreceptor.

It has been another object in the art to provide for the recordation of multiple images. U.S. Pat. No. 4,115,002, issued Sept. 19, 1978 to Clark, discloses a device whereby separate total images are selectively overlapped for integrating these individual images into a resulting final copy having a high information ratio. The images are projected onto the film plane through various lenses positioned in a predetermined manner. Provision is also made for color and density correction filters for altering the color balance and density, respectively, of the original images.

U.S. Pat. No. 3,703,135, issued Nov. 21, 1972 to Lang, also describes a multiple image film exposure and projection system. This system successively exposes small areas of a film frame through a shuttered lens array, thereby providing a plurality of individual images on the frame without the need to move either the camera or the frame.

A method of obtaining a double image of a single object is disclosed in U.S. Pat. No. 4,088,401, issued May 9, 1978 to Rees et al. In this method, multiple projection lenses with shutters are also used to achieve the double imaging.

The image on a CRT faceplate is created by deflecting and modulating an electron beam within the CRT vacuum envelope. As the electron beam strikes the inner wall of the CRT faceplate, a layer of phosphor converts the electron beam energy to light. The resolution of the CRT image depends on the electron beam spot size and shape, the grain size of the CRT phosphor, and the degree to which the beam deflection system can accurately and reproducibly address an absolute position on the CRT face. The geometric accuracy of the CRT image, while not specifically dependent on the CRT resolution, can equally affect the resolution and accuracy of the printed image, as can distortions introduced by the projection lens. The higher the resolution and geometric accuracy of the CRT image source, the more detailed and accurate will be the final printed image.

A major drawback to obtaining high resolution and accuracy in prior art film printers has been cost. In general, there is rarely an exactly known and fixed relationship between deflection system commands and resulting CRT beam position. Although this relationship may at some point in time be measured or calibrated, the varying of environmental factors such as temperature and magnetic field strength tend to reduce the long term accuracy and reliability of such information. Components and systems resistant to such changes are costly and imperfect. Consequently, the CRT image and resulting film print is usually only an approximation to the initial image data since the individual points of the image are never perfectly located.

Such considerations apply in the case of printing a color image. In order to insure correct registration of the three separate primary color frames, the film printer must maintain a high precision over the entire time required to print all three frames. Thermal drift of the beam deflection electronic parameters make such registration difficult.

One way to achieve a higher CRT display resolution is feedback, whereby inaccuracies are continually corrected. One such system, which utilizes a feedback arrangement to correct CRT display image displacement due to vibrations is disclosed in U.S. Pat. No. 4,630,115 issued Dec. 16, 1986 to Hilsum. In particular, this device directs light from a spot on the CRT screen onto a photocell which detects the position of the light spot. Feedback is then utilized to process the output of the photocell detector to provide a correction signal which is, in turn, utilized by the deflection system of the CRT to adjust the position of the electron beam and, hence, the light spot. This correction is applied to the image as a whole in order to reduce the net motion of the image. Individual points or pels within the image are not adjusted relative to one another, and the method does not enhance the accuracy or precision of the displayed image.

As discussed above, prior devices involve the use of single element photo-sensors. Moreover, where a photo-sensor is used to feed back CRT beam position information, the CRT beam must be moved to the periphery of the CRT surface in order to excite the sensor. Deflection system calibration information derived from such beam position measurements becomes progressively less accurate in regions away from the point of calibration. Deflection corrections which apply to beam positioning in the interior of the image must be extrapolated from these peripheral data and are consequently less accurate. The effective measuring range of a photosensitive element can be extended by enlarging the sensor area of the element. With this technique, however, it is increasingly difficult to ensure homogeneity over the entire enlarged sensor area. In addition, it becomes prohibitively expensive to provide further system components of sufficient precision.

U.S. Pat. No. 4,457,626 issued July 3, 1984 to Idesawa et al., describes an alternative type of device for more accurately determining positioning information. More specifically, this device includes a single lens in operative association with a mirrored cavity for reflecting a beam of light from a designated mark on an object onto a photosensitive element. The particular system used thereby, effectively enlarges the area of the photosensitive element. Idesawa et al.'s device uses a feedback algorithm which calculates positioning information based on the beam's detected position on the photosensitive element, the location of the object or spot source, and the number of reflections of the light beam within the mirrored cavity.

One disadvantage of this prior art device is the loss of intensity of the light beam incurred during reflection of the beam from the walls of the mirrored cavity. In addition, the walls of the mirrored cavity must be precisely parallel and flat to eliminate distortions which would otherwise occur. Also the size of the collection lens is limited to the physical size of the photosensitive element, because the mirrored walls must begin just at the edge of the photosensitive element and must encompass the collection lens.

A further disadvantage with prior art devices is that they can only correctly image surfaces of uniform curvature. Moreover, absolute position calibration, absent some knowledge of the history of a spot's motion, has heretofore not been easily achieved.

Thus, there exists in the art a genuine need for a film printing system which achieves a high precision and accuracy over the entire image area by the effective use of feedback for correct beam placement.

Furthermore, there exists a need for an inexpensive method of enhancing the effective area of existing photo-sensors without introducing distortions or limiting the available light.

Lastly, a need exists for the ability to precisely locate the CRT beam to provide for the accurate positioning and joining of adjacent image sections projected onto the recording film medium, thereby producing a single, high quality image that has a significantly higher resolution than the single CRT image source. Prior art does not disclose success in this process of merging image sections to reproduce a larger, original, single image. The prior art does reproduce multiple copies of a single image on a recording medium for applications such as semiconductor device fabrication or reproduction of an original image. The prior art also produces a plurality of related and separate images on the same recording medium.

DISCLOSURE OF THE INVENTION

The present invention provides a method and apparatus for recording an image onto a recording medium such as but not limited to film through the effective utilization of feedback of the position of a light spot to thereby accurately produce the image.

In particular, in a first embodiment of the invention the method and apparatus use a plurality of printing lenses organized in an array in order to increase and enhance the effective resolution of a CRT or other image source. In all embodiments of the invention, by decomposing a single image into sections, and printing each of those sections through the appropriate element of the printing lens array or by providing stepped relative motion between an image source and a recording medium in such a manner that the original image is reassembled on the recording medium, the effective area or resolution of the image source is increased.

In joining the various image sections into a final smooth image, the method and apparatus depend upon a type of feedback, e.g., optical. Systematic errors in the placement of the various image sections can result in distortions or alternate light and dark lines in the final print. Beam position feedback is used to locate the individual image points such that the image sections align and merge correctly on the recording medium. To reduce the chance of error, and to ease manufacturing requirements, the elements of the printing lens array are spaced such that each lens element can print over an area of the film larger than necessary. This produces an overlap of coverage in border regions of image sections, where the recorded image can accept light contributions from more than one lens of the printing lens array or alternatively from different relative positions of the light source and recording medium. In such border regions, the contributions of light to each image element by each lens or different relative positions of the light source and recording medium will be tailed so as to accurately join the adjacent image sections. The accurate placement of each point of the recorded image is necessary to eliminate artifacts which would indicate that the image was printed in sections. The use of optical feedback insures that each image point is correctly located.

In a first embodiment of the invention, the feedback process involves the use of a large coverage or multiple element photo-sensor in conjunction with a lens or lens array to detect the position of a light spot on the image source. This information will then be used to determine whether the light-emitting spot is in its correct or desired position, and/or to determine what corrective measures are necessary to move the spot to the desired position. Corrections are applied by varying the extent of deflection of the CRT or image source electron beam, which, in turn, moves the light spot.

Although it is possible to use a single lens and single sensor in the feedback process, there are advantages in the use of a sensor lens array to image the CRT surface onto the sensor. By using a lens array, the effective area of coverage or resolution of the sensor is extended and enhanced. The use of a lens array also allows a great deal of flexibility not found in prior art photo-sensor systems. For example, the individual spacings of the lens elements may be arranged so as to provide coverage at specific critical regions of the CRT or image source surface, including overlap of coverage. Also, other parameters of the lens elements, such as the focal lengths or object distances, may be individually varied to accommodate curved or otherwise unusual surfaces or regions on which the light emitting mark is found.

In addition, the lens array could simply embody a single lens split or divided so as to cast multiple images. The increase in effective coverage or resolution which accrues from the use of a multi-lens array in front of a photo-sensor has general utility in film printing applications where beam position feedback is utilized.

The position sensor may be implemented with a mask having a plurality of apertures which intercept light from the light source with at least one photosensitive element spaced from a back surface of the mask for generating a signal dependent upon the position of the light intersecting the apertures of the mask. The mask may be an exterior surface of a chamber with light only entering the chamber through the apertures with interior walls of the chamber reflecting or scattering light entering the chamber through the apertures and the at least one photosensitive element being mounted on an interior surface of the chamber and producing a signal dependent upon the position of the light intersecting the area of the mask.

The method and apparatus of the present invention can read as well as print film-based images or information. Film can be read by the CRT as a light source and measuring the amount of light transmitted through the film by some type of photo-sensor, e.g., photo-diode or photo-multiplier tube. The enhanced feedback sensor and printing lens of the present invention are used in the reading process to accurately position the beam to read out information at a precisely addressed location on the recorded medium and provide enhancements to the system.

The invention may be implemented to print a single image by sequentially printing a plurality of sections which comprise the single image by providing relative motion between a light source and a recording medium. The effect of this method is to provide increased resolution in the printed image over that which could be obtained if the image source were maintained in a fixed position relative to the recording medium. The effect of providing for relative motion between the image source and recording medium is an optical analog of the effect of printing through a printing lens array. The relative motion is produced by a translator having controllable positions for moving the recording medium relative to the light source during the recording of each of the plurality of sections. Prior to recording each section, a calibration system associated with the translator provides a position signal representing a position of the translator and a controller, which also controls the position of light emitted from the light source, determines if the translator is properly positioned to permit the printing of the next section to be recorded. If the translator is not properly positioned to permit recording of the next section, the controller causes a position command to be transmitted to the translator to cause the translator to move to a position to permit recording of the next section. In several embodiments of the invention, the translator has a low resolution position detector which provides the controller with low resolution coordinates. Furthermore, higher resolution coordinates are provided by the use of a feedback sensor or projection of a pattern on a photosensor which is monitored by the controller. The calibration of the position of light emitted from the light source provided by the optical feedback system is typically performed after movement of the translator to position the recording medium at a position to record the next section.

One advantage in providing for relative motion between the image source and the recording medium over the embodiment where a multiple lens printing array is used is an increase in the number of individual image sections which can be printed. As stated above, the invention provides for increased effective image source resolution by using a single image source to print a plurality of image sections. In the multiple printing lens embodiment, each image section is printed through one element of the printing lens array. For large images, the cost and size of the lens array becomes large. In the embodiments which provide relative motion between the image source and recording medium, the number of image sections which may be printed is limited only by the extent of translator motion and can be very large. In the embodiment using multiple printing lenses, the position of each lens must be measured or calibrated at the factory. This information is required to accurately locate the CRT light spot for each printed point on the recording medium. In embodiments which utilize relative motion to replace the lens array, it is also required that the position of the image source be known as each image section is printed. In these embodiments, a number of different ways to gather this information are disclosed. All have in common that the position of the image source light spot must ultimately be calibrated relative to positions on the recording medium so that the light spot used to expose the recording medium can be properly positioned.

A number of different implementations of the translator are within the scope of the invention. The position detector used in the optical feedback system may be fixed in position or moved with the translator. Calibration of the position of the translator may be achieved by providing high accuracy position detectors on the translator or by use of a low resolution position detector associated with the translator and by providing at least one reference pattern which is fixed to the translator and projected onto an associated photosensitive element by a light source with each photosensitive element providing a signal which is analyzed by the controller to determine with high resolution the position of the translator. High resolution calibration of the position of the light generated by the light source and high resolution calibration of the position of the translator may be achieved by a single photosensitive position sensor. The single photosensitive position sensor may comprise a mask having a plurality of apertures with the mask being a target surface of light from the light source and a photosensitive element displaced at a location spaced from a back surface of the mask.

An apparatus for recording an image onto a light recording medium by sequentially recording a plurality of sections onto the light recording medium which constitute the image in accordance with the invention includes a light source which emits light at a position which is movable over a light emitting area of the light source controlled by a controller, the position of the light being subject to deviation from a desired position on the light emitting area of the light source which corresponds to a position to be recorded on the recording medium which has recording position coordinates; a translator having controllable positions for moving the recording medium relative to the light source during the recording of the plurality of sections of the image; a light transmitting medium disposed between the light source and the recording medium for transmitting the light from the light source to the recording medium; a light position sensor having a target area optically coupled to light emitted from a plurality of positions within the light emitting area of the light source used for recording for detecting the position of the light intersecting the target area of the sensor from the light emitting area of the light source and generating at least one signal dependent upon the light intersecting the target area; and wherein the controller, responsive to the at least one signal, produces at least one correction parameter, sequentially controls the recording of the sections to record the image by controlling the position of the light on the light emitting area of the light source as a function of the at least one correction parameter during the recording of each section to cause the light to move to coordinates on the light emitting area of the light source to cause the light to intersect the recording medium at the recording position coordinates and controls the position of the translator for recording of each section. The controller may produce a plurality of correction parameters with each correction parameter being used during the recording of at least one area within the image. The correction parameters are sequentially produced by the controller with each sequentially produced correction parameter being used during recording of a different area. The correction parameters are produced by an algorithm which produces calculated coordinates of a plurality of points produced in response to the signal and corresponding recording position coordinates.

A calibration system is associated with the translator for providing the controller with a position signal representing a position of the translator and the controller, in response to the position signal, determines if the translator is positioned to permit recording of a next section to be recorded and if the translator is not positioned to permit recording of the next section causes a position command to be transmitted to the translator to cause the translator to move to a position to permit recording of the next section. At least one correction parameter is produced after the translator has been positioned to record the next section, the produced at least one correction parameter being used for recording at least one area within the image. Each area of the at least one area to be recorded may be equal to a section.

The light position sensor and translator may be configured to not move jointly. The light position sensor includes a mask having a plurality of apertures with the mask being the target area of the light position sensor and at least one photosensitive element disposed at a location spaced from a back surface of the mask for producing a signal indicative of light intersecting one of the at least one photosensitive element which has been emitted from the light source and which is the signal dependent upon the position of the light intersecting the target area. When the light source produces light to generate the at least one correction parameter and the light does not intersect the photosensitive element, the controller causes the light emitted from the light source to be moved across the surface of the light source to cause the light to pass through an aperture to intersect one photosensitive element and the controller determines coordinates of a position of the light in intersecting the mask as a function of signals applied to the light source to cause the intersection of the light on the one photosensitive element. A chamber may be provided containing a mask as an exterior surface of the chamber with light only entering the chamber through the apertures of the mask, interior walls of the chamber transmitting light entering the chamber through the apertures; and wherein the at least one photosensitive element is within the chamber and produces the signal indicative of light intersecting the target area when light strikes the chamber through one of the apertures and strikes one photosensitive element. A reflecting mirror is disposed with respect to a first beam splitter to reflect light which intersects the mask from a path leaving the beam splitter to the mask. The recording medium and mask may be disposed in parallel planes. When the light source produces light to generate at the least one correction parameter and the light does not intersect the at least one photosensitive element, the controller causes the light emitted from the light to be moved across the light emitting area of the light source to cause the light to pass through an aperture and intersect one photosensitive element and the controller determines coordinates of a position of the light in intersecting the mask as a function of signals applied to the light source to cause the intersection of the light on the one photosensitive element. The movement of the light across the light emitting area is repeated a plurality of times to cause the light emitted from the light source to pass through a plurality of different apertures with the at least one correction parameter being generated in response to signals produced by light passing through the plurality of apertures.

Alternatively, the light position sensor and the translator move jointly with a relative position of the sensor and translator being fixed during movement. The invention further includes a mount having first and second surfaces disposed in intersecting planes, the first surface holding the recording medium and the second surface being a target area of the light position sensor, the translator being connected to the mount; the light source projecting light along an optical path; and a first beam splitter disposed in the optical path for splitting light in the optical path into two paths and causing the parts to respectively intersect the recording medium and target area of the light position sensor. The light position sensor comprises a mask having a plurality of apertures with the mask being the target area of the light position sensor; and a photosensitive element disposed at a location spaced from a back surface of the mask for producing a signal indicative of light intersecting the photosensitive element which has been emitted from the light source and which is the signal dependent upon the position of the light intersecting the target area. When the light source produces light used for generating the at least one correction parameter and the light does not intersect the photosensitive element, the controller causes the light emitted from the light source to be moved across the light emitting area of the light source to cause the light to pass through an aperture and intersect the photosensitive element and the controller determines coordinates of the light in intersecting the mask as a function of signals applied to the light source to cause the intersection of the light on the photosensitive element. The movement of the light across the light emitting area is repeated a plurality of times to cause light emitted from the light source to pass through at least one different aperture with at least one correction parameter being generated in response to signals produced by light passing through the plurality of apertures.

A shutter is disposed within an optical path between the light source and the recording medium which is selectively opened in response to a control signal; and the controller generates the control signal to cause the shutter to open prior to the light source generating the light to intersect the recording position coordinates. A color filter is provided carrying a plurality of color filters which are positionable in the optical path under control of a color filter position signal; and the controller generates the color filter position signal to cause a particular color filter to be positioned in the optical path prior to the light source generating the light to intersect the recording position coordinates.

The light transmitting device may comprise a bundle of optical fibers coupling light emitted from the light source to the recording medium. A plurality of fibers of the bundle are respectively coupled to a plurality of different positions on the light emitting area of the light source and to the light position sensor; and light from the light source intersecting the individual fibers coupled to the light position sensor causes the generation of the at least one signal.

The invention further includes a position encoder associated with the translator for providing the controller with position coordinates of the translator with a first level of resolution; and the controller determines coordinates of the position of the translator with a second higher level of resolution than the first level of resolution in response to the position coordinates outputted by the light position sensor and a position of the light on the light emitting surface of the light source. The recording medium and a reference pattern may be mounted on the translator and a light source projects a reference pattern on the light position sensor to cause the light position sensor to output signals in response to the reference pattern intersecting the light position sensor. The invention further includes a shutter which is selectively opened in response to a control signal generated by the controller prior to the light source generating the light to intersect the recording position coordinates; a beam splitter disposed in an optical path of light emitted from the light source, light in a first path from the optical path intersecting the beam splitter intersecting the light position sensor to cause the generation of the signal dependent upon the light intersecting the target area, light in a second path from the optical path intersecting the beam splitter intersecting the shutter, passing through the shutter and intersecting the recording medium to record the recording medium; and the reference pattern passes through the beam splitter to the light position sensor to cause the light position sensor to output the signal in response to the reference pattern intersecting the position sensor. The invention further includes a color filter carrying a plurality of color filters which are positionable in one of the optical path and the first path under control of a color filter position signal; and the controller generates the color filter position signal to cause a particular color filter to be positioned prior to light intersecting the light position coordinates.

The light source projects light along an optical path intersecting the recording medium; and the invention further includes a shutter disposed within the optical path between the light source and the recording medium which is selectively opened in response to a control signal; the controller generates the control signal to cause the shutter to open prior to the light source generating the light to intersect the recording position coordinates; and a beam splitter is disposed in the optical path for splitting light in the optical path into two parts and causes the parts to respectively continue to the recording medium and to the target surface of the light position sensor. The invention further includes a color filter carrying a plurality of color filters which are positionable in the optical path under control of a color filter position signal; and the controller generates the color filter position signal to cause a particular color filter to be positioned to intersect the light which is to intersect the recording position coordinates.

The invention further includes a position encoder associated with the translator for providing the controller with position coordinates of the translator with a first level of resolution; at least one reference pattern mounted on the translator; a light source for projecting each reference pattern onto an associated photosensitive sensor, each photosensitive sensor producing an output signal in response to the projection of the reference pattern onto the photosensitive sensor; and wherein the controller determines coordinates of the translator with a second higher level of resolution than the first level of resolution in response to the position coordinates from at least one photosensitive sensor and a position of the light on the light emitting surface of the light source. Two reference patterns are projected onto two photosensitive sensors.

The light position sensor comprises a mask having a plurality of apertures with the mask being the target area of the light position sensor; and at least one photosensitive element is disposed at a location spaced from a back surface of the mask for producing a signal indicative of light intersecting one photosensitive element which has been emitted from the light source and which is the signal dependent upon the position of the light intersecting the target area. The invention further includes a chamber containing the mask as an exterior surface of the chamber with light only entering the chamber through the apertures of the mask, interior walls of the chamber transmitting light entering the chamber through the apertures; and wherein the at least one photosensitive element is within the chamber and produces the signal indicative of light intersecting one photosensitive element when light enters the chamber through one of the apertures and strikes the one photosensitive element.

An apparatus for recording an image on a light recording medium in accordance with the invention includes a light source which emits light at a position which is movable over an area of the light source controlled by a controller, the position of the light being subject to deviation from a desired position on the area of the light source which corresponds to a recording position to be recorded on the recording medium which has recording position coordinates; a light transmitting device, disposed between the light source and the recording medium, for transmitting the light from the image source to the recording medium, the light position sensor having a mask having a plurality of apertures which are the target area of the light position sensor; at least one photosensitive element disposed at a location spaced from a back surface of the mask for producing a signal indicative of light intersecting one of the at least one photosensitive element which has been emitted from the light source and which is the signal dependent upon the position of the light intersecting the target area; a light position sensor having a target area optically coupled to light emitted from a plurality of positions within the area of the light source used for recording for detecting the position of the light intersecting the target area of the sensor from the light of the light source and generating at least one signal dependent upon the position of the light intersecting the target area; and wherein the controller, responsive to the signal, produces at least one correction parameter and controls the position of the light on the area of the light source as a function of the at least one correction parameter to cause the light to move to coordinates on the area of the light source to cause the light to intersect the recording medium at the recording position coordinates. The light transmitting device further comprises an array of lenses and associated shutters which selectively permit passage of light through each individual lens of the array of lenses. When the light source produces light to generate the at least one correction parameter and the light does not intersect the photosensitive element, the controller causes the light emitted from the light source to be moved across the surface area of the light source to cause the light to pass through an aperture to intersect one photosensitive element and the controller determines coordinates of a position of the light in intersecting the mask as a function of signals applied to the light source to cause the intersection of the light on the one photosensitive element.

An apparatus for reading an image recorded onto a light recording medium by sequentially reading a plurality of recorded sections of the light recording medium which constitute the image in accordance with the invention includes a light source which emits light at a position which is movable over a light emitting area of the light source controlled by a controller, the position of the light being subject to deviation from a desired position on the light emitting area of the light source which corresponds to a recorded section which has been recorded on the recording medium which has recorded position coordinates; a translator having controllable positions for moving the recorded medium relative to the light source during the reading of the plurality of sections of the image; a light transmitting medium disposed between the light source and the recording medium for transmitting the light from the light source to the recording medium; a light position sensor having a target area optically coupled to light emitted from a plurality of positions within the light emitting area of the light source used for reading for detecting the position of the light intersecting the target area of the sensor from the light emitting area of the light source and generating at least one signal dependent upon the light intersecting the target area, a reading sensor positioned for being optically coupled to light from the light source for sensing light intersecting the recorded medium and wherein the controller, responsive to the signal, produces at least one correction parameter, sequentially controls the reading of recorded sections by controlling the position of the light on the light emitting area of the light source as a function of at least one correction parameter during the reading of each section to cause the light to move to coordinates on a light emitting area of the light source to cause the light to intersect the recorded medium at the recorded position coordinates and controls the position of the translator for reading of each section.

BRIEF DESCRIPTION OF DRAWING

FIG. 4 illustrates a power series for expressing a transfer function;

FIG. 12 illustrates a feathering process of joining image sections according to the present invention;

FIGS. 14A and B illustrate an embodiment of a position sensor which may be used with the present invention;

FIG. 15 illustrates another embodiment of a position sensor which may be used with the present invention;

FIG. 16 illustrates an embodiment of a light transmitting device for coupling light from a light source to the recording medium and the position sensor;

DETAILED DESCRIPTION

Figure 1:
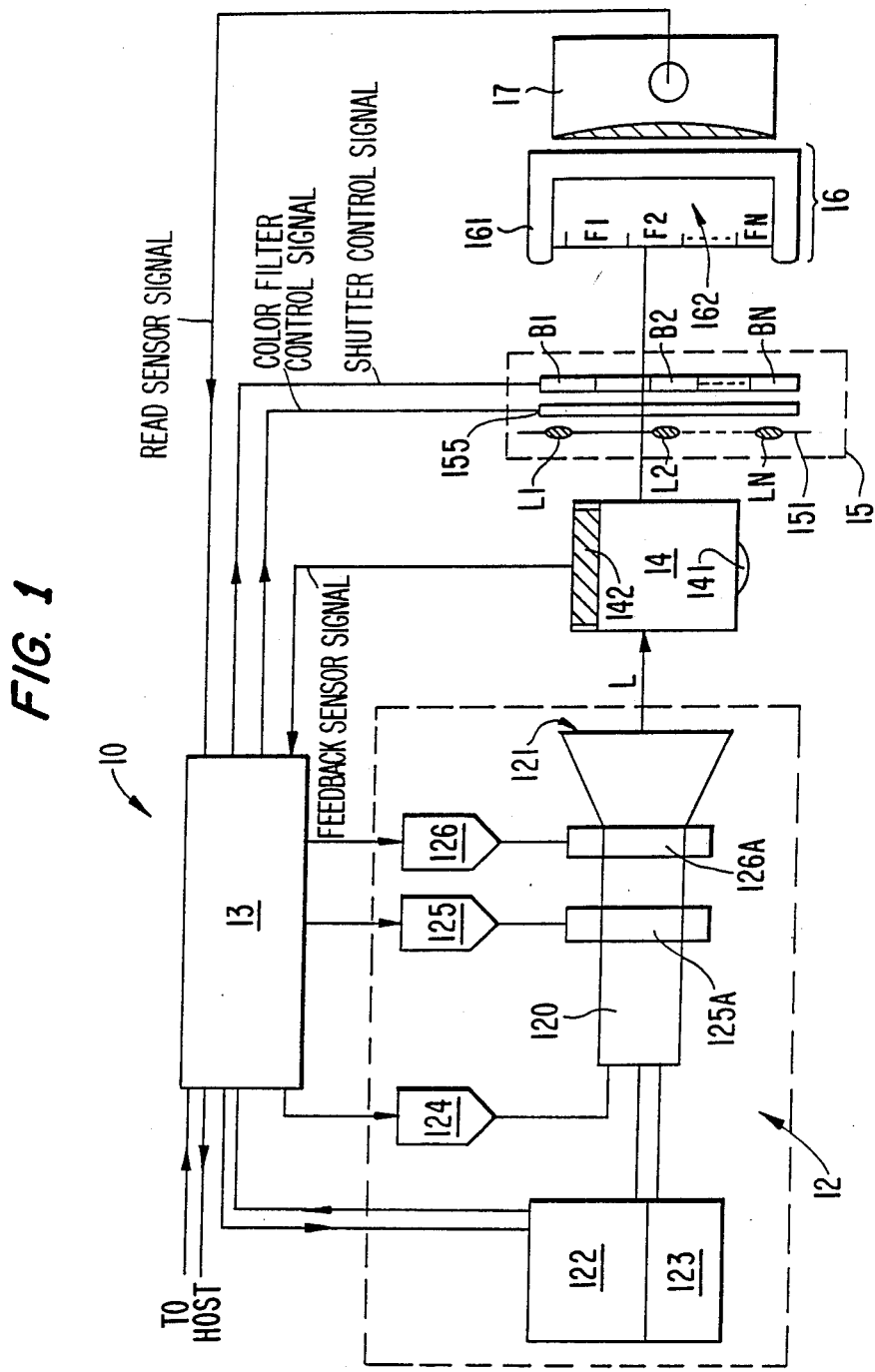
FIG. 1 is a block diagram of a first embodiment of a recording/reading system of the present invention.

Referring now to the drawings and, more particularly, to FIG. 1, a first embodiment 10 of a film printing/reading system in accordance with the invention is illustrated. The first embodiment 10 generally comprises an image/light source 12, controller 13, feedback sensor 14, lens assembly 15, film plane assembly 16, and reading sensor 17.

In a preferred embodiment, image/light source 12 generally consists of a cathode ray tube (CRT) 120. CRT 120 provides for the illumination of encoded information such as an image on the CRT faceplate 121. Image light source 12 also contains power supplies, e.g., anode and focus power supplies 122 and heater and control grid (G1, G2) power supplies 123, as well as a video amplifier 124, all of which serve to produce an image on the CRT faceplate. More specifically, the image on the CRT faceplate is created in a way similar to that used in displaying commercial television images, viz., by deflecting and modulating an electron beam within the CRT vacuum envelope. Accordingly, X deflection amplifier 125 and Y deflection amplifier 126 are controllable deflection assemblies such as digital to analog converters followed by power amplifiers which are used in conjunction with X deflection yoke 125A and Y deflection yoke 126A, respectively, to deflect the electron beam.

In reproducing an image, points on the CRT faceplate 121 are mapped onto film plane assembly 16 through lens assembly 15. In order to increase the number of pels or lines which may be printed by a CRT 120 of fixed resolution, an image is divided into sections and printed by section onto film plane assembly 16 with the sections being addressable with X,Y coordinates or other coordinate systems. Film plane assembly 16 consists of a film holder 161 which contains a recording medium 162, such as film, upon which an image is projected.

Lens assembly 15 consists of a printing lens array 151 containing a matrix of lens elements L1 through LN. Printing lens array 151 can be wide area (NXM) or one dimensional (1XN) depending upon the particular application desired. Each lens element L1–LN has an associated shutter B1–BN which is utilized when transmitting an image. For example, each shutter B1–BN is opened for the time needed to print one image section, which is displayed on the CRT as the time under the control of controller 13. The full image is then printed by sequentially displaying each image section on the CRT, opening the appropriate shutter B1–BN, thus exposing the correct lens element L1–LN and projecting that section of the image onto the correct region of the recording medium 162.

It should be recognized that applications involving both monochromatic (black and white) and polychromatic (multiple individual colors) images are encompassed within the scope of the present invention. In the case of the latter embodiment, a color filter 155 is positioned proximate to the printing lens array 151 such that light passing through lens elements L1–LN also passes through filter 155 and, thus, assumes the appropriate color value before being projected onto the film plane assembly 16. Generally, such color filters are mounted on a wheel or ring referred to as a "filter wheel". The controller 13 controls the positioning of a filter having an appropriate color value in the optical path of the light for purposes of recording on the film with the color of light transmitted by the filter.

The film plane assembly 16, and more particularly, the recording medium 162, is separated by the geometry of lens array 151 into its own theoretical matrix of tangential square regions F1–FN. Lens elements L1–LN are constructed and positioned such that each lens—shutter element (LN/BN) can project an image section of the CRT faceplate that more than covers the associated element FN of the theoretical matrix of recording medium 162.

In order to accurately reproduce an image, therefore, each section of the final image must be printed without the effects of gaps or overlaps associated with adjacent sections. To accomplish this result, the system 10 utilizes feedback sensor 14 and controller 13.

Figure 2:
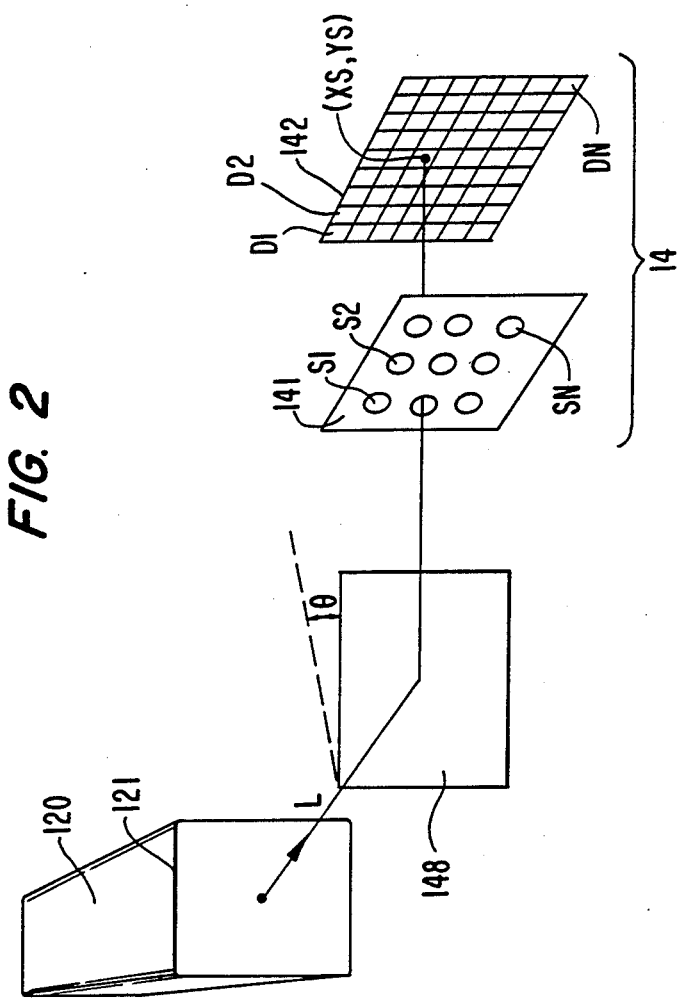
FIG. 2 illustrates an embodiment of a feedback sensor used with the embodiments of the present invention.

As shown in FIG. 2, in a preferred embodiment, feedback sensor 14 includes sensor lens array 141 containing a matrix of lens elements S1–SN and a photosensitive element 142. A light beam L which is projected from an image on the CRT faceplate 121 is directed by beam splitter 148 through sensor lens array 141. The beam splitter 148 is placed at a forty-five degree angle with respect to the plane of the CRT faceplate 121, and serves to direct light from the CRT onto sensor lens array 141. Of course, it would also be possible to position CRT 120 such that light would reach feedback sensor 14 directly.

Light beam L passes through sensor lens array 141 and falls onto photosensitive element 142. Element 142 consists of a wide area array of adjacent photosensitive elements such as a charge coupled device (CCD) array, a photo-diode array, a charge injection device (CID), or some similar array of closely packed elements. As shown in FIG. 2, photosensitive element 142 consists of an array of photo-diodes D1–DN. As light beam L is projected onto the sensor area of element 142, one or more of the photo-diodes D1–DN is activated. Light beam L falls onto photosensitive element 142 at a particular sensed position having coordinates (XS, YS).

As shown in FIG. 1, the sensed position (XS, YS) is then fed back to controller 13. The (XS, YS) coordinates are then converted by reference to a pre-established algorithm or mapping, to film coordinates (XF, YF) and compared to a desired print position (X, Y). Controller 13 adjusts light/image source 12 accordingly, and the appropriate image point is then accurately printed onto recording medium 162, and the process is repeated until the entire image section is constructed on the recording medium.

In an alternative embodiment of the present invention, feedback sensor 14 is placed in between lens assembly 15 and film plane assembly 16. The sensor would then receive light reflected from the surface of the film plane. This particular arrangement is useful in situations where it would be advantageous to gather light from the film plane rather than the CRT for feedback purposes.

Figure 3:
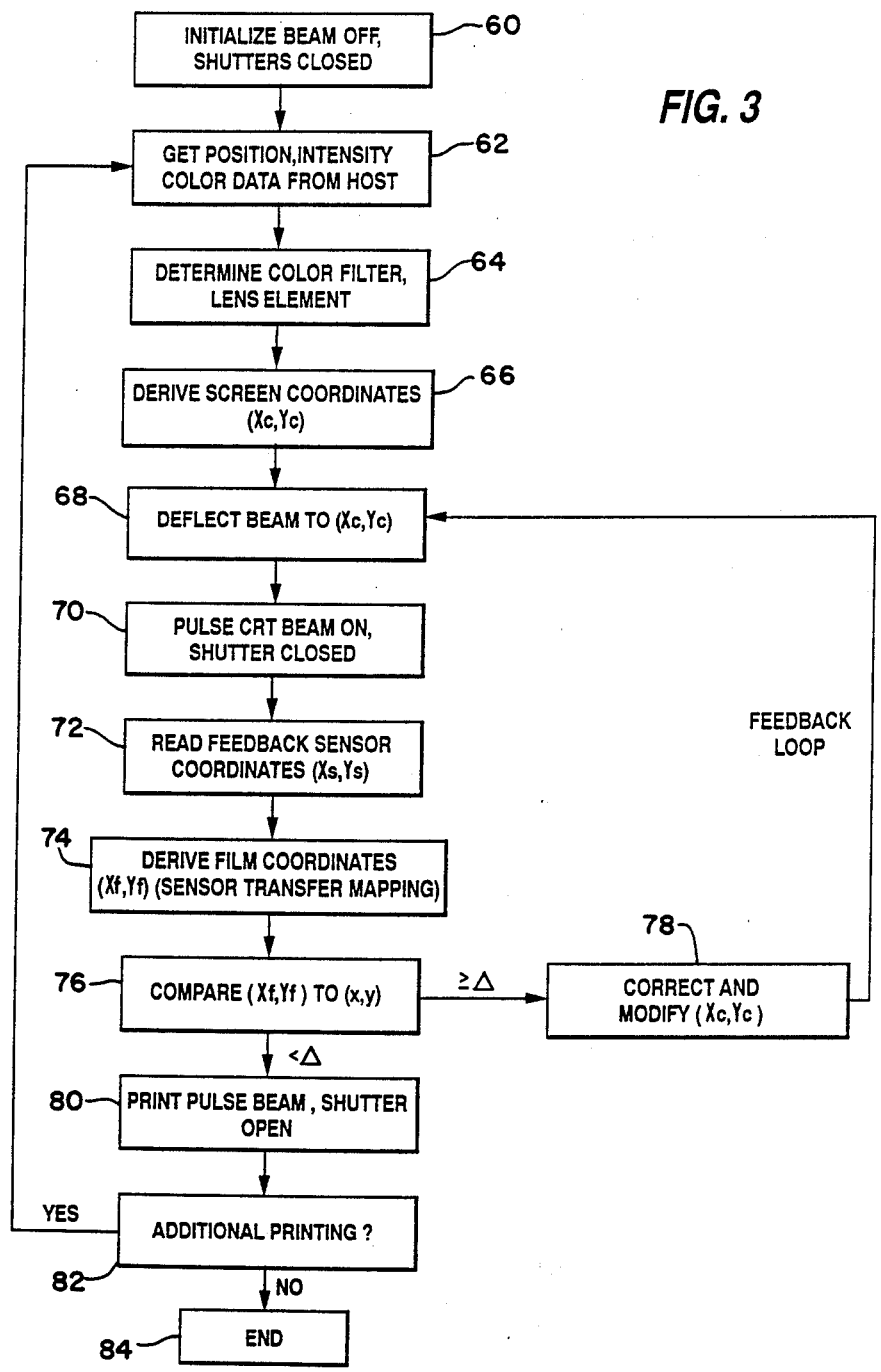
FIG. 3 is a flow chart of the steps involved in the printing process of the first embodiment of the present invention.

The flow chart of FIG. 3 delineates the steps involved in the printing process of the present invention and more specifically, the printing of a single pel or point onto film. Generally by printing a sequence of pels, a number of steps involved in the printing sequence could be eliminated since a single deflection calibration may be used for an area smaller than or larger than an image section F1–FN, thereby increasing the efficiency of the system. This reduction of steps is possible in areas where there is no need to resort to feedback at each image point. Such areas are identified as collections of closely lying image points which suffer substantially the same aberrations or displacements. A single measurement of these aberrations or displacements using the feedback sensor system will therefore yield correction parameters which apply to all points within the area.

At point 60 in the operation, the CRT beam is turned off and the shutters of the printing lens array are closed. Any necessary initialization procedures are performed, including the obtaining from the host computer parameter specifications such as film sensitivity, speed data, image and picture sizes, and color correction codes. The controller then obtains data on the position (X, Y), color C, and intensity Z of the next point to be printed as indicated at point 62. The (X, Y) coordinates represent points on a hypothetical Cartesian coordinate system on the film.

Using the (X, Y) value, the controller determines in which segment of the film plane the point lies, and accordingly sets an internal status bit to indicate which lens element LN of the printing lens array should be unshuttered when actual printing is done. The controller further positions the appropriate color filter in front of the selected lens element based upon the prior obtained color data C as indicated at point 64.

The printer system next derives the CRT screen point coordinates as indicated at point 66. More specifically, using a CRT mapping algorithm, the system estimates the point (Xc, Yc) on the CRT faceplate which corresponds to the desired point (X, Y) on the film plane. The CRT mapping algorithm relates coordinates on the film plane to positions on the CRT faceplate such that a light beam emitted from a point (Xc, Yc) on the CRT faceplate is projected onto the film plane at point (X, Y).

This relation is then translated into command information for the deflection assembly. This algorithm may rely either on mathematical calculations or on a look-up table, using pre-determined, precalibrated parameters. The derivation of the algorithm is described below in conjunction with FIGS. 5-9.

The command information is sent to digital to analog converters which drive the CRT beam deflection electronics. Controller 13 instructs the deflection electronics to move the CRT beam to a point on the CRT faceplate which would roughly place the projected point at the desired location on the recording medium as indicated at point 68. The controller 13 relies on the inherent linearity of standard deflection systems to perform this task accurately. In general, within a particular image section, beam deflection instructions or data will be proportional to the (X,Y) coordinates of the image element position, but include an offset which depends on which section is being printed (or read). This correspondence constitutes an unstated calibrated algorithm or mapping. The point of the CRT face to which the beam is deflected (although it might then be turned off) is indicated by the coordinates (Xc, Yc).

The deflection amplifiers may be either electromagnetic or electrostatic type deflection units. With the shutters remaining closed, the CRT light beam is pulsed on for a predetermined period of time as indicated at point 70. During this time, the light beam is directed to the feedback sensor such that the beam falls upon the photo-sensitive element at a point (Xs, Ys).

Next the controller interrogates the feedback sensor to obtain the coordinates (Xs, Ys) as indicated at point 72. The sensor position values (Xs, Ys) are then converted into film coordinates (Xf, Yf) using a sensor transfer mapping algorithm as indicated at point 74. This algorithm may also depend upon mathematical calculations, table look-up, or both. The mapping data utilized in the algorithm are based upon the geometrical relationships among the plane of the sensor, the CRT faceplate, the printing lens array, and the film plane. These geometrical relationships are quantified and encoded during manufacture, and accompany the film printing system throughout its use. The mapping may also be obtained by using the unit's film reading capability. In this case, a special film image, accompanied by descriptive information, is read or digitized by the film printer system. Comparing the digitized information to the description associated with the calibrated image yields a transfer map or algorithm.

Using the value (Xs, Ys) and the particular lens element LN of the printing lens array, the system calculates a position (Xf, Yf) which corresponds to the point on the film where the light spot from the CRT would be projected if the shutter BN of the N'th element LN of the printing lens array were opened.

The desired film printing position (X, Y) is then compared to the point (Xf, Yf) as indicated at point 76. If the difference between these two positions is less than a predetermined criterion or threshold, $\Delta$, the light beam is considered to be correctly aimed, and the printing of the point by opening the appropriate shutter/lens elements (BN/LN) and pulsing the light beam therethrough onto the film is achieved as indicated at point 80. The beam is pulsed on for a time T at a beam current I. The resulting film exposure as determined by the product $T*I*V$, where V is the CRT beam or anode voltage and is often a constant value, is proportional to the desired intensity Z originally stored in the host.

Printing the correct intensity on the recording medium involves using controller 13 to command the CRT to emit a certain intensity of light at the appropriate location for an appropriate time T and current I. The intensity of light emitted from the CRT in response to specific commands from controller 13 is calibrated periodically. The feedback sensor, used to measure the CRT beam position, can also be used to sample the CRT beam spot intensity. Since an image of the spot normally appears somewhere on the sensor element, and since most photo-sensors respond proportionally to light intensity, such a measurement is possible. These data will be used to insure correct film printing intensity.

If, however, the difference in position values is greater than the threshold, the position of the CRT light beam must be adjusted accordingly as indicated at point 78. Once the appropriate adjustments to the position of the beam have been made via the controller and the deflection electronics, the point is then printed as described above. The printing process is then repeated as indicated at point 82 until all desired points have been printed as indicated at point 84.

The film may also be printed in a "burst" mode whereby the appropriate correction parameters are evaluated over small regions of the CRT rather than on a point by point basis. In this case, it is assumed that the image points lie sufficiently close to each other, or are so uniformly affected by aberrations in the deflection and lens systems, that one set of correction data applies to all points within the region. It is assumed that the aberrations change slowly enough with time that all points within the region can be printed before the correction data becomes inaccurate. This correction data, when applied to the beam deflection system, serves to properly and accurately locate each of the image elements on the recording medium. An advantage of printing in a burst mode would be a reduction in printing time by eliminating time for calibration of the CRT for each point to be printed.

If there is some uniform way in which the deflection system is deficient or inaccurate, this inaccuracy can be measured to derive at least one correction parameter which is applied to all points within the limited area of the image. This would allow a precise location of the CRT beam without resorting to the feedback system at each point The particular way in which the deflection command data would be corrected or modified would be found by comparing (X, Y) values to (Xf, Yf) values for a number of separate image points within the area of interest. This comparison would lead to at least one simple correction parameter which would be used to modify the deflection system command data. This is essentially a higher level use of the feedback loop data, in that several feedback measurements are integrated into a location correction table/algorithm for the deflection system.

The term "CRT coordinates" also means "CRT deflection commands", or whatever information is used to move the CRT 120 light spot to a given position. The calibration that relates CRT coordinates to film coordinates automatically takes into account all aberrations, non-linearities, and distortions, etc. that affect the position of the light spot on the film plane. Calibration of the deflection system corrects for optical aberrations of the light transport system such as occur in the projection lens. The term "deflection calibration" is used for the calibration procedure because only the deflection system parameters are subject to change under normal circumstances. So "calibration" means the derivation using optical feedback of a relationship between CRT (image source) coordinates and film plane (recording medium) coordinates which can be used to calculate appropriate CRT (image source) coordinates given desired print position (recording medium) coordinates.

In the following embodiments, the term CRT is used to describe the image source, and CRT coordinates are used to describe locations on the CRT screen or faceplate. Furthermore, the recording medium is frequently identified as film. It should be understood that the invention includes, but is not limited to these particular embodiments with other light sources having a controllable light emitting spot and any light sensitive recording medium being within the scope of the invention.

One embodiment of the calibration data is a power series, as shown in FIG. 4. In FIG. 4, the CRT coordinates are calculated as a function of desired film position (Xfilm, Yfilm), which are labeled (X,Y) in FIG. 4, and parameters A(N) and B(N), which are one embodiment of the calibration parameters or correction parameters. If these parameters are properly evaluated, this equation provides a means to calculate the CRT coordinates required to accurately locate the CRT light beam at a particular point on the film. These parameters can be evaluated if a representative set of data relating CRT coordinates and film coordinates are available. These data are normally supplied by the optical feedback system as pairs of corresponding CRT and film coordinated points. Specifically, in the case where the calibration data take the form of a power series, the parameters can be evaluated by a "least squared" mathematical fitting procedure. This procedure calculates the values of the parameters A(N), B(N) such that the (Xcrt, Ycrt) can be predicted given the input values for (Xfilm, Yfilm). The accuracy of the result depends on the correct choice of included terms in the power series representation, on the number and distribution of the representative data pairs, and on the accuracy of the input data. The choice of power series terms depends on the details of the optical system and the deflection system. Consequently, the specific form of the equation may vary with different embodiments of the invention. The parameters A(N) and B(N) may vary with time, due to changes in the electrical parameters which characterize the deflection system. These changes are caused, for example, by temperature variations, and require that the calibration procedure be repeated, or at least checked for accuracy, periodically. The parameters may be different for physically separated locations within the image, in which case recalibration would be required as different areas of the recording medium are printed.

One use of the optical feedback system is to provide the representative data pairs, relating CRT coordinates to film coordinates, from which the calibration parameters A(N) and B(N) are evaluated.

The calibration process begins as a point is displayed on the CRT area at position (Xcrt, Ycrt). As the point is displayed, an image of the light spot is projected onto the surface of the feedback sensor at position (Xsensor, Ysensor). The feedback sensor is interrogated by the controller to determine these position coordinates. The controller stores the display coordinates (Xcrt, Ycrt) along with the sensor coordinates (Xsensor, Ysensor). This process is repeated for a number of points distributed over the display area.

For each sensor point (Xsensor, Ysensor) the controller calculates a film plane location (Xfilm, Yfilm), which is the point at which the light from the CRT would have intersected the film plane were the appropriate shutters open. The film coordinates are calculated from the sensor coordinates by reference to a factory calibrated mapping or calculational algorithm which relates sensor coordinates to film coordinates in the above sense. The mapping or algorithm can be embodied as a power series, in which the film coordinates (Xfilm, Yfilm) are calculated as a function of the sensor coordinates (Xsensor, Ysensor) and a number of calibration parameters AS(N) and BS(N). The parameters AS(N) and BS(N) are determined by the details of the optical system which transmits light from the image source to the sensor and to the film, and are evaluated at the factory, as described below. Since the optical system does not vary with time like the deflection system, these parameters are constant, and do not normally require re-evaluation.

In this way, the controller produces pairs of points which relate CRT coordinates to film coordinates. These data are used as input to the fitting procedure which calculates the coefficients of the power series of FIG. 4. This completes the calibration of the deflection system.

Figure 5:
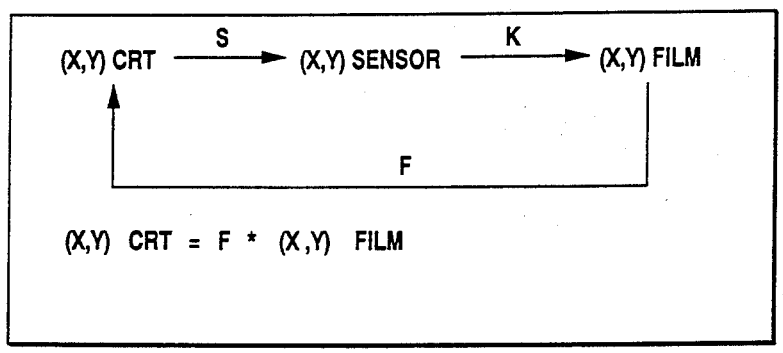
FIG. 5 illustrates a first method of calibrating the deflection system of the present invention.

The calibration process can be symbolized as shown in FIG. 5. In FIG. 5, CRT coordinates (X,Y)crt are transformed to sensor coordinates (X,Y)sensor by the transform labeled (S). This transform symbolizes the transmission of light from the image source to the feedback sensor. The calculation of film coordinates from sensor coordinates is symbolized by the transform labeled (K). This transform requires the factory calibrated mapping which relates sensor coordinates to film coordinates. The transform (F) symbolizes the calculational form of the calibration data, which may appear as a power series expansion as in FIG. 4. Film coordinates are converted to CRT coordinates using the calibration data embodied in the transfer function F. This relation can be symbolically written as:

(Xcrt, Ycrt) = F*(Xfilm, Yfilm)

where "F*" symbolizes the application of the (F) transform to whatever follows, in this case the film coordinates.

Factory calibration data is used to derive a closed form analytic expression which relates film plane coordinates to feedback sensor coordinates. The analytic expression can take the mathematical form shown below:

$$\begin{aligned}
X\text{film} = &\ AS(0) + AS(1)*X + AS(2)*Y + AS(3)*X*Y + \\
&\ AS(4)*X*X + AS(5)Y*Y + AS(6)*X*R + \\
&\ AS(7)*Y*R + AS(8)*X*R*R + AS(9)*Y*R*R
\end{aligned}$$

$$\begin{aligned}
Y\text{film} = &\ BS(0) + BS(1)*X + BS(2)*Y + BS(3)*X*Y + \\
&\ BS(4)*X*X + BS(5)*Y*Y + BS(6)*X*R + \\
&\ BS(7)*X*R + BS(8)*X*R*R + BS(9)*Y*R*R
\end{aligned}$$

Xfilm and Yfilm are film or target coordinates, and the (X,Y) are shorthand for the sensor coordinates—(Xsensor, Ysensor)—where the light spot is projected onto the feedback sensor. The AS(N) and BS(N) are the coefficients of the power series which mathematically connects the film coordinates to the sensor coordinates. There are a number of terms in the expansion. These terms must be specifically tailored to anticipate the expected aberrations which occur in the optical system and elsewhere. A number of terms depend on the radius R and the radius squared R*R, where R=square root of the quantity (X*X+Y*Y). The specific terms included in power series will change in different embodiments of the invention.

The expansion coefficients are an encoded form of the geometric relationship between the sensor and film planes. These power series equations are used to derive the position of the light spot on the film surface (Xfilm, Yfilm) knowing the location of the spot on the sensor surface (Xsensor, Ysensor).

Since the coefficients AS(N) and BS(N) are fixed by the geometry of the film printing hardware, they are constant in time since the physical geometry of the system is fixed (short of damage). The coefficients are derived by mathematically fitting the form of the equation, using least squared methods, to known data (measured at the factory) which relates the two planes. This process is similar to the process used to evaluate the coefficients of the power series relating CRT coordinates to film coordinates.

The process begins by displaying a number of points on the CRT surface and recording the positions where the spots are projected onto both the film plane and the sensor plane. This process is performed at the factory using sensing equipment used to measure the position of the light spot on the film plane while recording the data from the feedback sensor. The result of the data gathering phase is a collection of pairs of points relating spot positions on the sensor to spot positions on the film. This data can be directly used to calculate the coefficients AS(N) using standard least-squared fitting techniques. The validity of the coefficients and the accuracy of the derived relationship will depend on the choice of terms included in the expansion series. In general, the choice of terms is made knowing the way in which the light spot is conveyed from the CRT to the two targets. The factory calibration results in an equation accurately relating sensor coordinates to film plane coordinates Changes in the deflection system parameters of the CRT 120 accumulate slowly with time. Consequently, these changes may be mathematically simpler to describe than the total characteristics of the deflection system. If the deflection system of CRT 120 can be recalibrated often enough, changes in the deflection parameters can be described by a power series expansion of fewer terms than are required to totally characterize the deflection. Using this fact can simplify the calibration procedure performed in "burst mode" calibration.

The simplified calibration process essentially derives at least one correction parameter used for correcting the existing deflection calibration rather than deriving the whole calibration itself. This saves time and can improve the accuracy of the calibration.

Figure 6:
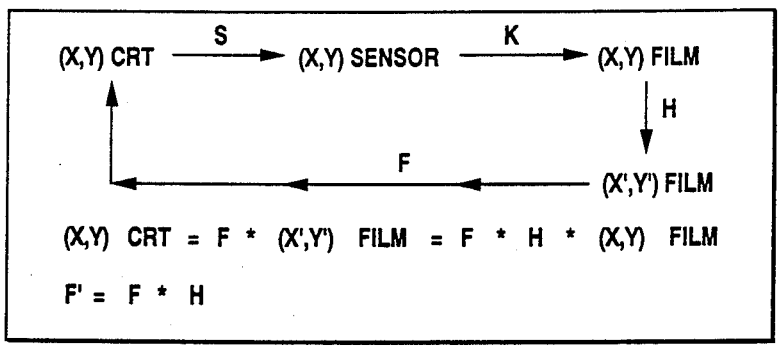
FIG. 6 illustrates a second method of calibrating the deflection system of the present invention.

With reference to FIG. 6, the calibration process begins with a set of "target" film coordinates (X'film, Y'film), which represent the desired location on the film of a number of points to be "printed". Quotes appear around "printed" because these points are never "printed" on film, but are used only for calibration of the deflection system. The prime mark (') is used to distinguish these "target" film coordinates from the real "resultant" film coordinates derived later. With reference to FIG. 6, the primed film coordinates, which appear at the bottom-right corner, are converted to CRT coordinates (or commands) using the existing deflection calibration data embodied in the transfer function (F). This relation can be symbolically written as:

$$(Xcrt, Ycrt) = F^*(X'film, Y'film)$$

where "F*" symbolizes the application of the transfer function (F) to whatever follows, in this case the primed film coordinates. The CRT light spot is located at the CRT coordinates, and the light spot is turned on briefly.

In this way a number of points (about 20) are displayed on the CRT 120. The feedback sensor coordinates (Xsensor, Ysensor) are read and stored for each point. The sensor coordinates are converted to equivalent film coordinates (Xfilm, Yfilm) using the aforefixed factory calibration of the feedback sensor relating these two planes, and symbolized by the transform labeled K in FIG. 6. These film coordinates are unprimed, and differ from the intended (primed) target film locations (X'film, Y'film) which were used to originally calculate the necessary CRT coordinates. The difference between the expected and actual film coordinates can arise if the deflection transfer function (F) is no longer accurate due to electronic drift of the deflection system parameter. Still, the unprimed film coordinates represent where the light spot would actually hit the film were the shutters open. This is true because the transfer function (K) relating sensor coordinates to film coordinates, which was used to calculate these values from the sensor coordinates, always maintains its accuracy since no deflection parameters are involved.

Next a correction transfer function (H) is derived by fitting the primed film coordinates to the unprimed film coordinates.

$$(X'film, Y'film) = H^*(Xfilm, Yfilm) \tag{1}$$

Note that the CRT coordinates were derived using $$(Xcrt, Ycrt) = F^*(X'film, Y'film) \tag{2}$$

Applying the function (F) to each side of equation (1), and then substituting equation (2) the result is:

$$F^*(X'film, Y'film) = F^*H^*(Xfilm, Yfilm) \tag{3}$$

$$(Xcrt, Ycrt) = F^*H^*(Xfilm, Yfilm) \tag{4}$$

Equation (4) relates the CRT coordinates (Xcrt, Ycrt) of a printed point to the actual resulting film coordinates (Xfilm, Yfilm) of that point. This data typifies the relationship needed to calculate CRT coordinates from film coordinates in order to correctly locate the CRT light spot.

Consequently, the new and correct relation between the film coordinates and CRT coordinates is the product of the old transfer (F) and the function (H) which we just derived:

$$F' = F^*H \tag{5}$$

The indicated product can be formed either by multiplication of the matrices which hold the coefficients of the F and H power series transforms (see below), or by sequential application of both the H and F individual transforms. In practice, sometimes the same F is used, and H is rederived when recalibration is necessary. Alternately, F can be replaced with F', which means the coefficients of the F calculational algorithm (normally a power series expansion) are updated.

This method establishes an accurate working relation between the CRT coordinates and the film coordinates. The advantage here is that the function H, which is simply a correction to the existing transfer function F, is simpler and consequently easier to evaluate than the total transfer function F. Essentially it is necessary to evaluate only the changes to the deflection command system and not the whole system itself, and use this information H to update the existing calibration F.

In all embodiments, the transfer function (F) could not be accurately derived if it were limited to inspecting points on the periphery of the image. In the case where the transfer function F is embodied as a power series, in order to accurately locate the CRT light spot, many power series terms are necessary in the equation which relates film plane locations to CRT locations. In order to derive the coefficients of these terms, it is necessary to collect calibration data from a number of points distributed over the active area of light source CRT 120.

The transfer function H can be expressed as a power series. In this case, H is derived by mathematically fitting the calibration data to a particular set of power series terms. The calibration data determines the coefficients of the power series. With known coefficients, the power series can be used to correct the CRT coordinates derived using the standard transfer function F. In this way, we formulate an accurate algorithm for predicting the CRT coordinates needed to locate the light spot at a certain film location.

In one embodiment the power series represented symbolically by H has the form:

$$X = A(1)*X' + A(2)*Y' + A(3) \tag{6}$$

$$Y = B(1)*X' + B(2)*Y' + B(3) \tag{7}$$

Figure 7:
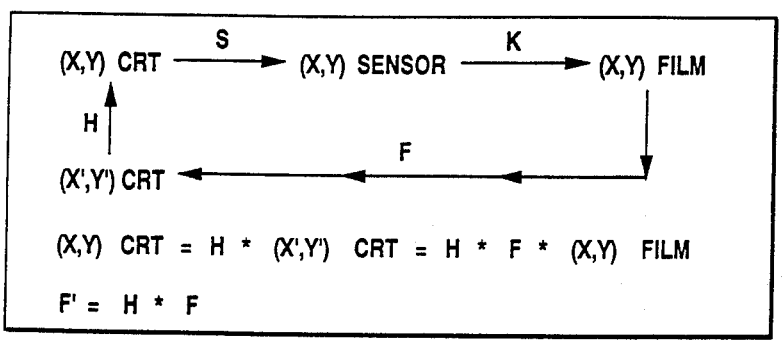
FIG. 7 illustrates a third method of calibrating the deflection system of the present invention.

The method of FIG. 7 is almost identical to the method of FIG. 6 described above. The difference is that this correction transform H is derived by fitting desired CRT coordinates to calculated CRT coordinates, rather than fitting desired film coordinates to actual film coordinates. The H function is not the same in both cases, but can still be used to determine an accurate F' function. In the method of FIG. 7, the new function F' is found by:

$$F' = H*F. \tag{8}$$

It should be noted that the order in which the transforms are applied has been reversed.

Figure 8:
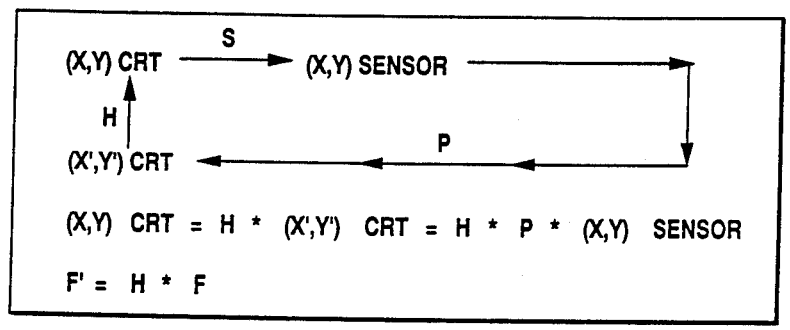
FIG. 8 illustrates a fourth method of calibrating the deflection system of the present invention.

The method of FIG. 8 is almost identical to the methods of FIGS. 6 and 7, but by-passes the use of film coordinates during feedback calibration. In the method of FIG. 8, another factory calibrated transform P is used to relate feedback sensor positions to CRT positions. This calibration is separate from (but related to) the mapping which relates film coordinates to sensor coordinates. Essentially, the P transform represents a standard "reference" relation between the sensor coordinates and CRT coordinates, and is nominally equal to the product of transforms K & F in the method of FIG. 5.

The calibration of the deflection system using optical feedback follows the same steps as before to determine a correction transform H. This transform is used to modify/correct the film-to-CRT mapping by:

$$F' = H*F \tag{9}$$

where F' is the new, corrected map.

Figure 9:
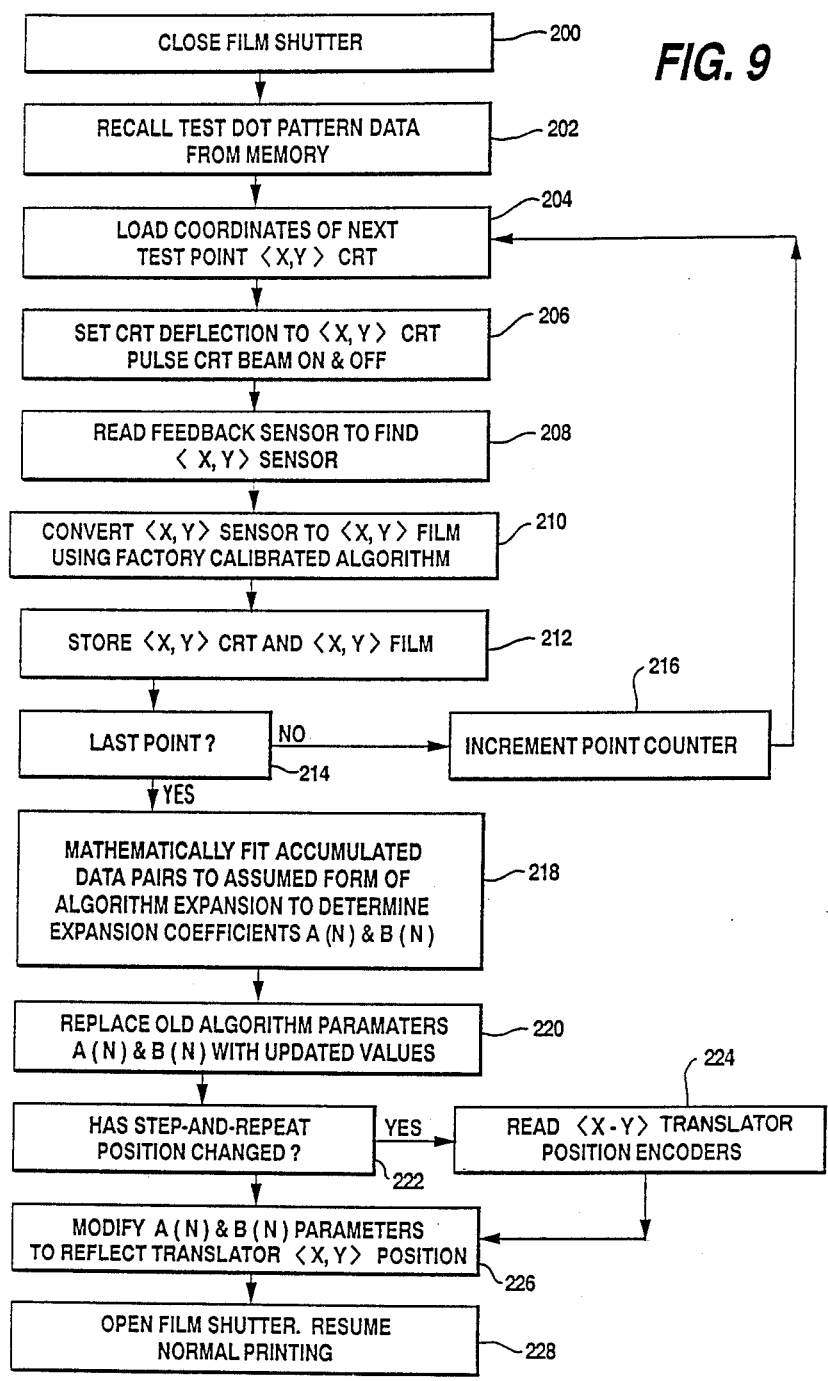
FIG. 9 illustrates a detailed flow chart of the calibration of the deflection system.

FIG. 9 illustrates a flow chart detailing the sequence of steps required to calibrate the deflection system of the embodiments of the invention.

The following numbered paragraphs refer to corresponding numbered steps of the flow chart in FIG. 9.

200. Close the film shutter so that light from CRT 120 can not improperly expose the recording medium during the calibration procedure.

202. Recall a predetermined set of test points as referred to above from memory associated with controller 13. This set consists of a number (about 20) of points defined by their (X,Y) position on the CRT.

204. This is the beginning step of a loop. Recall the <X,Y> coordinates of the next test point.

206. Deflection of the CRT beam and "print" occurs at this point. Since the film is shuttered off, no "printing" occurs. The feedback sensor 14, is imaged with light from CRT 120 which is unaffected by the film shutter.

208. After exposure, the sensor 14 is interrogated to find where the light spot from the CRT 120 intersects the sensor surface. This position is represented by (X,Y) sensor coordinates.

210. Using the factory-provided sensor calibration data, the (X,Y) sensor coordinates are converted to (X,Y) film coordinates. The film coordinates identify where the light spot would have intersected the film had the film shutter been opened. The actual calculation of the film coordinates from the sensor 14 coordinates uses a calculational algorithm like the power series in FIG. 4. In multiple-lens type systems, as in FIG. 1 in accordance with the invention, there is one factory calibration for each lens, and the correct sensor-calibration data set must be used. In step-and-repeat systems of FIGS. 17, 19–22 described below, there is only one lens, and consequently only one factory calibration.

212. The CRT coordinates and the film coordinates are stored in local computer memory.

214 and 216. If there are more test points to "print" the point counter is incremented and operation loops around to step 204.

218. The test printing is all done. Here the data is interpreted to yield a calculational algorithm for correcting the deflection system. A number of data pairs (CRT & film) which describe the mapping or relationship between CRT coordinates and film coordinates in the sense that a point of light emitted at point (X,Y)crt will result in an exposed spot on the film at point (X,Y) film are used. The data is fitted to a power series expansion, as in FIG. 4. The raw data is used to determine the coefficients A(N) & B(N) of the series expansion. These coefficients then represent an encoded description of the relationship between CRT and film coordinates. The power series representation is readily used in practice. Knowing the A(N) & B(N) coefficients and the desired film location to be exposed, the required CRT deflection or coordinates can be predicted. The mathematical fitting procedure which determines the coefficients of the power series is a least-squared fit. Note that other data encoding schemes could have been used. The success of the method does not rely on any particular representation.

220. The old A(N) & B(N) coefficients in memory are replaced with the new values.

222 and 224. These steps would not appear in systems which utilize multiple lens printing of FIG. 1, and are unique to step-and-repeat systems of FIGS. 17 and 19-22.

In step-and-repeat systems, the calculational algorithm relating CRT coordinates to film coordinates depends on the position of the translator described below with reference to FIGS. 17 and 19-22 relative to the CRT. In order to predict where the CRT light will hit the recording medium, it must be known where the film is. This position is provided most simply by high resolution encoders associated with the motors which are part of the translator as described below in conjunction with FIG. 17. In other implementations, the film location information may be provided with low resolution encoders associated with the motors of the translator supplemented by optical feedback of a reference grid, or mask as described below with reference to FIGS. 19-22 to provide high resolution determination. The power series coefficients A(N) & B(N) can be modified to reflect the relative position of the film and CRT.

228. The film shutter is opened and normal printing is resumed, with the knowledge that each and every image point will fall at the properly allocated film position.

Figure 10:
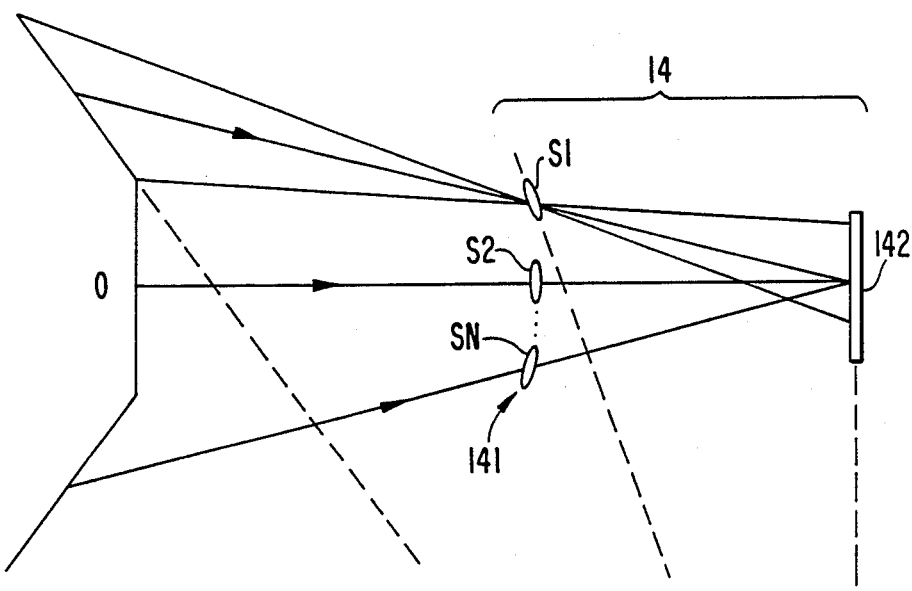
FIG. 10 illustrates an alternative embodiment of the feedback sensor of the present invention, which accounts for non-flat light emitters.

Although the feedback sensor will work with a single lens in place of sensor lens array 141 and a single photosensor as element 142, there are advantages, e.g., cost benefits, in artificially enhancing the effective area of the photo-sensitive element by using a lens array. More specifically, as shown in FIG. 10, the net effect of sensor array 141 is to extend the effective area of coverage of the sensor, thereby enhancing the resolution of the sensor. The use of a lens array also permits a flexibility not found in prior systems. In particular, the individual spacings of the sensor lens array elements S1-SN may be arranged so as to provide coverage at specific critical regions of the image source (shown in FIG. 10 as object O), including an overlap of coverage. Additional parameters of sensor lens elements S1-SN, such as focal lengths or object distances, may be individually varied to accommodate unusual, e.g., curved, surfaces or regions on object O upon which a light emitting mark is found.

The case where a lens array couples light from the image source to the optical feedback sensor requires a two level calibration. Referring to the numerals in FIG. 1, light emitted from a point on image source 121 is directed by beam splitter 148 to the optical feedback sensor 14. Lens array 141 focuses light from image source 121 onto photosensor array 142. Lens array 141 is constructed, and in particular the spacing of the individual elements of the lens array is designed, so that different areas of the image source are focused onto the photosensor array by each lens element. These different areas of the image source may overlap to some extent, or they may be fully separated. The photosensor array 142 can be interrogated by controller 13 to which is to say that the controller can determine the (Xs, Ys) coordinates of the light spot. Absent any other information it would be impossible to determine the location of the light spot on the image source from (Xs, Ys) since there is a natural ambiguity introduced by the plurality of lens elements 141. This is to say, image spots produced at a number of different image source locations can result in a spot at the same location of photosensor 142 by propagating through different lens elements. This ambiguity in the sensor response is resolved by the uncalibrated image source light positioning system. In the case where the image source is a CRT, there exists an approximate deflection system calibration formed by the basic circuit elements of the deflection electronics, even in the absence of feedback calibration. In most instances, this inherent or residual calibration is accurate to a few percent. For example, commercial television systems, which nominally lack any optical feedback means, use this residual calibration to reliably locate the television image near the center of the television screen. This residual calibration determines the approximate position of the light spot. Knowing the approximate position of the light spot on the image source identifies the element of lens array 141 used to transmit light onto sensor 142. The identity of the lens element in turn determines which set of calibration parameters should be used to derive image coordinates or recording medium coordinates from the sensed data (Xs, Ys). These calibration parameters are provided by factory calibration as previously described, and may mathematically assume the form of a power series, look up table, or some other calculational form. In this way, a dual level calibration scheme is used to provide high precision spot location coordinates. These data can be used directly for light spot control, or can be integrated to form correction parameters used to position the light spot position during burst mode printing. Note that the spacing and location of the lens elements of array 141 must be specifically designed so that the dual level calibration process will operate properly.

Figure 11:
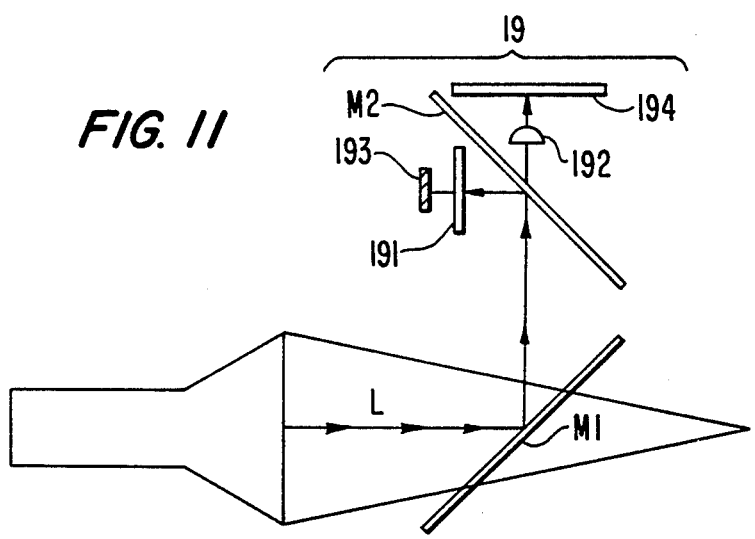
FIG. 11 illustrates an alternative embodiment of the feedback sensor which utilizes charge coupling devices as photosensitive elements.

An alternative embodiment and arrangement of the feedback sensor is shown in FIG. 11. In this embodiment, feedback sensor 19 includes cylindrical lenses 191 and 192. Two linear charge coupled devices 193 and 194 are placed at right angles with respect to each other, and serve to locate the CRT light beam L in both X and Y directions. Sensor devices 193 and 194 may consist of linear arrays of, e.g., approximately 2000 by 1 elements. To accommodate both sensor devices 193 and 194, light beam L must be split twice—which is accomplished by directing the light beam through beam splitting partially reflecting mirrors M1 and M2.

The use of the feedback sensor within the present system provides for the accurate reproduction of an image by accurately joining adjacent image sections. The success of the image joining procedure is based primarily on the high positional accuracy of the photographic system provided by optical feedback which is used to calibrate the light source positioning system. To reduce the visual effect of systematic or residual errors in image point placement in the overlap region, the additional technique of "feathering" the edges of adjacent image sections can be used.

This feathering of edges is shown in more detail in FIG. 12 with it being understood that other techniques may be used alternatively in practicing the invention with the invention not being limited to any particular technique. In this instance, the lens elements L1-LN of printing lens array 151 are positioned so that there is an overlap of coverage on the film plane 162. As shown in FIG. 12, region 300 is the overlap in print coverage of lens elements L1 and L2. Thus, the areas where image sections are to be joined will be accessible by at least two lens elements, and further accessible by up to four lens elements at the corners.

Each edge is printed with decreasing intensity as a border is approached and crossed. The graph of exposure density shows the result of this feathering process.

More specifically, full film exposure is achieved by feathered contributions from two or more lens elements. Region 100A shows the print intensity through lens element L1; region 200A shows the print intensity through lens element L2; and region 300A shows the sum of exposure from both lenses L1 and L2 This technique serves to reduce the visual effect of any small errors in joining adjacent image sections, and results in an enhanced image reproduction.

Figure 13:
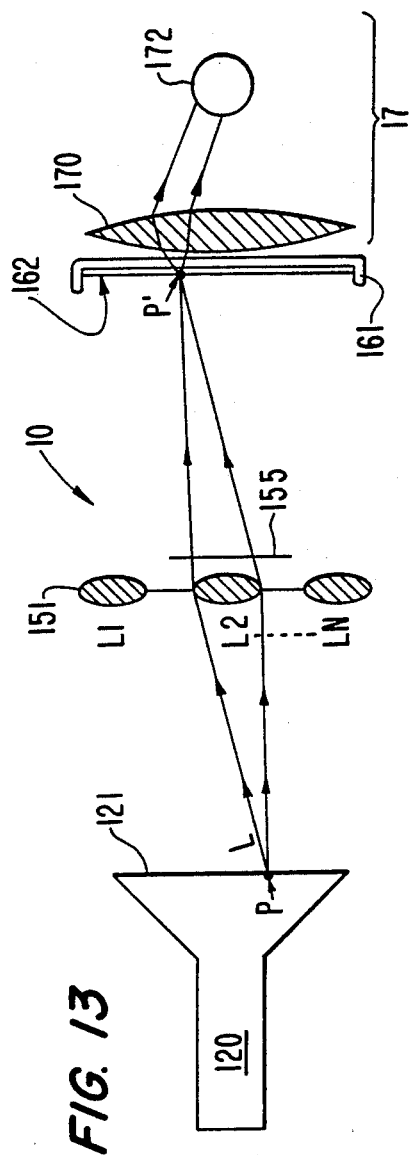
FIG. 13 is a block diagram of the film reading process according to the present invention.

The photographic system of the present invention can also be adapted to add a film reading capability. piece of either positive film reading is the digitization of the density of a negative film. Color film is read by digitizing the density of the film with respect to the three primary colors at each point within the film image. The process of digitization usually involves casting a spot of light on a known point of the film and measuring the transmittance of light through the film at that point by placing a light sensor such as a photo-diode or photo-tube, behind the film plane. The transmittance is defined as the intensity of the transmitted light L divided by the initial light intensity Z. As shown in FIG. 13, reading sensor 17 is positioned behind film place 162 within the photographic system 10. For this reading process, film holder 161 is transparent. Reading sensor 17 includes collection lens 170 and digitizing photo-sensor 172.

In reading the density of a color print, the CRT beam is located at a known point P on the CRT faceplate 121 corresponding to a desired point P' on the film plane 162. The beam position (X, Y) is accurately determined by the same feedback loop used in the printing process described above. Color filter wheel 155, corresponding to the color being digitized, is placed in the light path before the light reaches either film plane 162 or sensor 172. Next, the beam L is either pulsed or turned on continuously. In either case, a measurement of the initial and transmitted beam intensity Z is made. These measurements are digitized and interpreted to yield a film density. This data is then transferred to a host system or otherwise appropriately stored. The CRT beam L is moved to the next point to be digitized, and the process is repeated, including the insertion of the appropriate color filter in the sequence.

Prior art systems digitized film on a hypothetically orthogonal grid. Due to beam positioning errors, these grids were not in fact orthogonal, but somewhat deformed. Repeated digitization and reconstruction only served to increase the extent of distortion. The system of the present invention is not limited by such constraints. By using the enhanced feedback loop, film can be digitized repeatedly on an exact cartesian coordinate grid.

The ability to read or digitize film has an important impact on the film printer/reader feedback calibration process. Normally, the geometric relationships among the CRT face, the film plane, and the feedback sensor are predetermined and calibrated at the factory. Such calibration information accompanies a film printer system as coefficients stored in permanent memory such as ROM. However, with the present system, the ability to accurately read film also allows user or post-production calibration. In place of film, a specially drawn photo-mask is put into the position of film plane 162 and held in place by holder 161. This photo-mask is essentially a calibration image. The film printer system 10 can then self-calibrate by reading the specially drawn photo-mask, and comparing the results to an accompanying data set of "expected" results from the calibration mode. This comparison then results in a revised calibration mapping algorithm. Thus the system is able to read, modify, and reprint a modified image.

In an alternative embodiment of the film reading mode, the film to be read is independent of the film holder. In this case, a beam splitter would be used to split the light on the film side of the printing lens assembly.

FIGS. 14A and B illustrate an alternative embodiment of a feedback sensor 600 which may be used in place of the feedback sensor of FIG. 1. The feedback sensor 600 has the advantage of being less expensive than the feedback sensor of FIG. 1 which utilizes a wide area array of photosensor detectors 141 such as charge couple devices, a photo-diode array, a charge injection device, etc. A light shield 601 encloses the sensor. In place of the wide area array, a mask 602 having a plurality of apertures 604, which are spaced about the mask, is a light target for the feedback sensor of the embodiments of the present invention. A suitable lens 606 may be used to focus the light from the CRT 120 onto the mask 602. Lens 608 focuses light emitted from the individual aperture 604 onto a photosensitive element 610 which may be a photodiode or other photosensor. The overall cost of the photosensitive element 610 is less than the aforementioned wide area elements. The spacing between individual apertures 604 is chosen to be larger than the ability of the CRT 120 to position the light beam at a particular location on its light emitting surface.

The mask sensor 600 is used to calibrate the CRT deflection system and therefore replaces the wide area sensors identified above. This calibration is performed by moving the CRT beam to a location such that an image of the light spot falls on an aperture 604 of the mask 602. Finding this location may involve moving the CRT beam in a "search pattern" but the success of the search is detected by a response from the photosensitive element 610. There is no mechanism to tell from the photosensor 610 which aperture 604 the light is coming through so there is a certain amount of ambiguity in the calibration. This ambiguity is removed by the uncalibrated or "residual" response of the CRT deflection system which is normally sufficient to locate the CRT spot with an error of less than a few percent. The spacing of the mask apertures 604 is specifically designed so that this inherent CRT deflection calibration is able to resolve the ambiguity in aperture identity. In some embodiments, this information is supplemental by the "rough" measurement of the translator position described below in conjunction with the embodiments of FIGS. 17 and 19–22 provided by the encoders attached to the translator or translator motors. Disregarding the position of the translator, it is always possible to deflect the CRT beam to an approximate point on the CRT without activating any feedback loops or by using an approximate calibration evaluated at the factory. Calibration proceeds from the standard "residual" deflection calibration to moving the CRT beam to a point where the odds are good that an image of the beam will be projected onto a particular aperture 604 in the sensor 600. A determination is made if the aperture 604 was intersected by the light beam by the controller 13 monitoring the photosensor 610 output. If no output is produced, the aperture 604 has been missed and a search pattern must be undertaken. The CRT beam is moved in small increments in a predetermined pattern such as rectangles of increasing periphery until a response is produced by the photosensor 610. Once a response is produced by the photosensor 610, the controller 13 knows exactly where the beam is with respect to the recording medium plane since the exact location of the light beam with respect to the fixed coordinate system of the sensor is known provided the exact location of each aperture 604 is factory calibrated. This data can be converted to equivalent recording medium coordinates using a sensor to recording medium calibration as discussed above. Performing this "search and remember" process for a number of aperture 604 provides sufficient data to calibrate the deflection system in terms of recording medium plane coordinates. For the embodiments of FIGS. 17 and 19–22 which have a movable translator on which at least the recording medium is supported, additional calibration is needed which is described below.

FIG. 15 illustrates an alternative embodiment of a position sensor utilizing mask 602. Like reference numerals identify like parts in FIGS. 14 and 15. The embodiment of FIG. 15 differs in that a wide area photosensor 612 is spaced apart from a back surface of the mask 602. The disadvantage of the embodiment of FIG. 15 is that the photosensor 612 has a larger active surface area which adds additional cost to the feedback sensor. In both FIGS. 14A–B and 15, the light shield 601, shown as an encompassing box, serves to protect the photosensor from stray light which has not passed through aperture 602.

FIG. 16 illustrates an embodiment of an optical coupling mechanism 630 for coupling light from the CRT 120 to the film plane assembly 16. A fiber optical bundle 632 which is comprised of a plurality of individual fiber optic elements of conventional design conducts light between the CRT faceplate 121 and the film plane. As shown, the bundle 632 has a rectangular cross-sectional area facing the CRT faceplate 121. One or more lenses 634 may be disposed between the faceplate 121 and an entry face 636 having a rectangular surface area and between a discharge face 638 and the film plane assembly 16. Individual fiber optic elements 640, which are located at a plurality of positions within the surface area that correspond to the positions discussed above used for calibrating the deflection assembly of the CRT 120, are optically coupled to the feedback sensor 14. The feedback sensor 14 is coupled to the controller in the manner described above in conjunction with FIG. 1. The position of the individual fiber optic elements 640 is chosen to provide the best location of the multiple points discussed above for calibrating the deflection assembly of the CRT 120.

Figure 17:
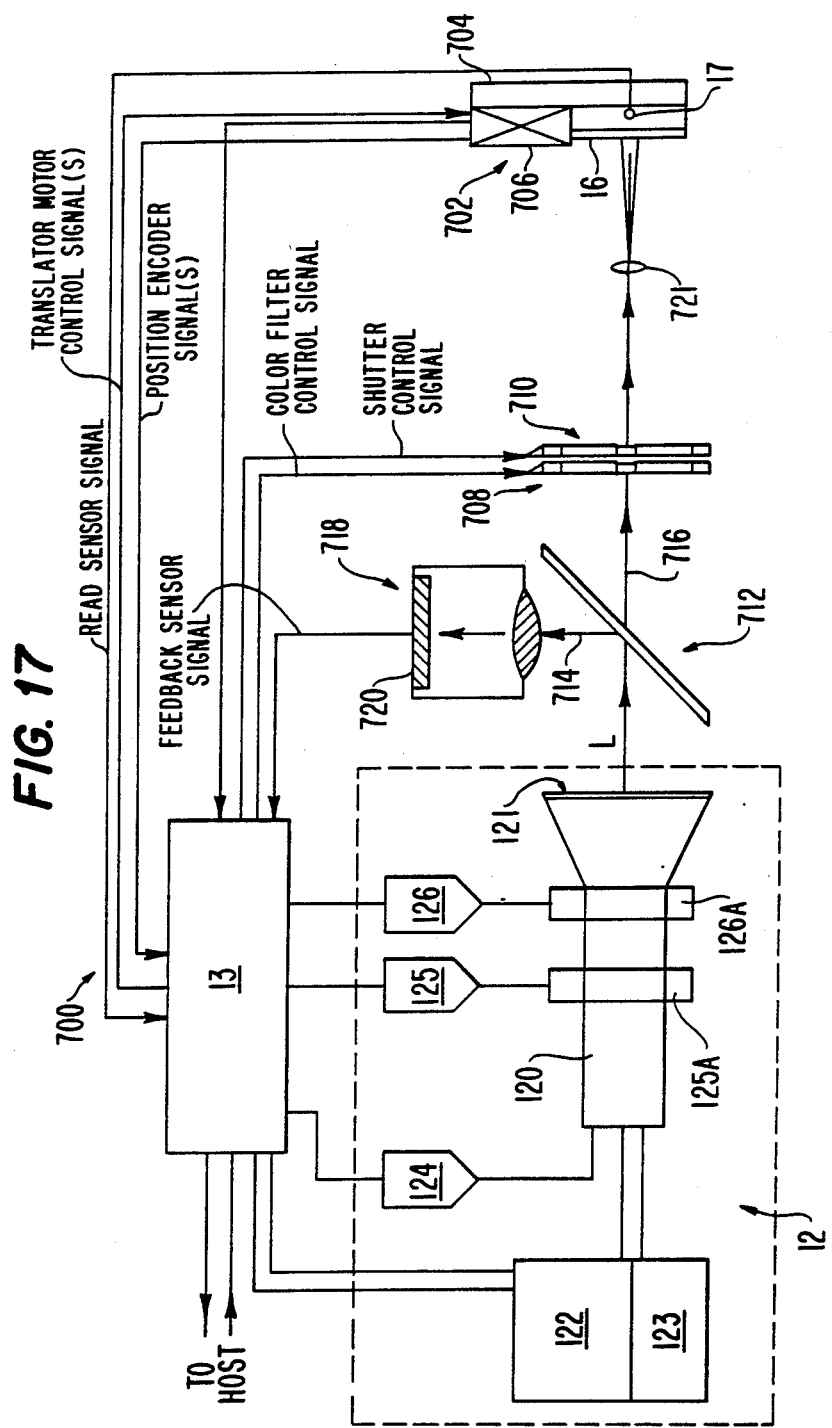
FIG. 17 illustrates a second embodiment of a recording/reading system of the present invention.

FIG. 17 illustrates a second embodiment 700 of the present invention which differs from the first embodiment of FIG. 1 in that a translator 702 is provided having a plurality of controllable positions locatable in a coordinate system for moving the recording medium relative to the CRT 120 during the recording of a plurality of sections which comprises the image. In practicing the invention different designs of the translator may be used as long as they permit the controllable positioning of the recording medium, light source for recording different sections or both of the recording medium and light source to produce relative motion. The image which is recorded by the system 700 is identical to the image recorded by the system of FIG. 1. Instead of utilizing a plurality of lenses L1–LN for recording the different sections which comprise the image, the translator 702 functions to sequentially position the film plane assembly 16 to record a plurality of sections which constitute the image by sequentially moving the recording medium held by the film plane assembly 16 to a different position each time a different section is to be recorded. If the translator 702 was used for positioning the light source for recording each section, it would be attached to the light source instead of the film plane assembly as illustrated. Like reference numerals identify like parts in FIGS. 1 and 17. The translator 702 includes a movable platform 704 which contains a pair of motors 706 which are movable in accordance with X,Y program coordinates which are supplied from the controller 13 in the form of the TRANSLATOR MOTOR CONTROL SIGNAL(S). The motors may be stepping motors. Alternatively, motion of the translator under position commands from the controller 13 in other coordinate systems is within the scope of the invention. As illustrated the translator 702 provides high resolution position coordinates in the form of the POSITION ENCODER SIGNAL(S) from a position sensor associated with the translator 704 or motors 706 to provide the controller 13 with coordinates of sufficient accuracy to permit high accuracy calibration of the deflection system using the optical feedback system. The controller 13 would not function properly to calibrate the deflection system without high resolution position information of the movable platform 704 as a consequence of the calibration of the deflection system involving mapping of the light emitted from the CRT onto the coordinates of the film plane assembly 16 which necessarily requires an accurate location of the film plane assembly to be sensed. Each time the recording medium is to be moved to record a new section, a new set of coordinates are outputted by the controller 13 to the motors 706 of the movable platform 704 to command it to move to a new position. The movable platform 704 may be moved under control of a pair of motors 706 which respectively move the platform in orthogonal directions in an X,Y coordinate system. A high resolution position encoder associated with the motors 706 provides the controller with the aforementioned precise location coordinates of the movable platform 704 so as to permit the controller 13 to command the precise position to which the platform should be moved to print the next section. A color filter wheel 708 contains a plurality of filters which transmit light of different colors, such as the primary colors red, blue and green, selectively to the film plane assembly 16. The controller 13 commands the color filter wheel 708 with the COLOR FILTER CONTROL SIGNAL to position the appropriate color filter in the path of the light to expose the recording medium on the film plane assembly 16 to a particular color. Shutter 710 selectively opens under the control of the SHUTTER CONTROL SIGNAL outputted by controller 13 in the same manner as the shutter of FIG. 1. Beam splitter 712 splits light emitted from the CRT 120 into two optical paths 714 and 716 which respectively image light on feedback sensor 718 which provides the FEEDBACK SENSOR SIGNAL to the controller 13 indicative of the position of the light striking a photosensitive medium 720 which is in the optical path 714. The feedback sensor 718 is used in the same manner as the feedback sensor 14 of FIG. 1. The multiple lenses of the feedback sensor of FIG. 1 may be eliminated. The second path 716 passes through the color filter wheel 708 and shutter 710 and is focused by a lens 721 onto the film plane assembly 16 which contains the recording medium. An optional reading sensor 17 is provided on the far side of the recording medium to permit the selective readout of previously exposed film at precise film readout coordinates as indicated by the READ SENSOR SIGNAL. The system of FIG. 17 operates in the same manner as the system of FIG. 1 in that it may be used to individually calibrate the position of each PEL (picture element) which is exposed on the recording medium prior to imaging each PEL with light emitted from the CRT 120. Alternatively, the system of FIG. 17 may be used to print in the "burst" mode as described above. Typically, the calibration of the deflection system by the feedback sensor 718 would only be performed during the printing of areas of the recording medium contained on the film plane assembly 16 which may be either smaller than or larger than the sections which are printed by each addressable position of the table 704. As illustrated movement of the translator 702 is up and down and in and out with respect to the plane of FIG. 17.

Figure 18:
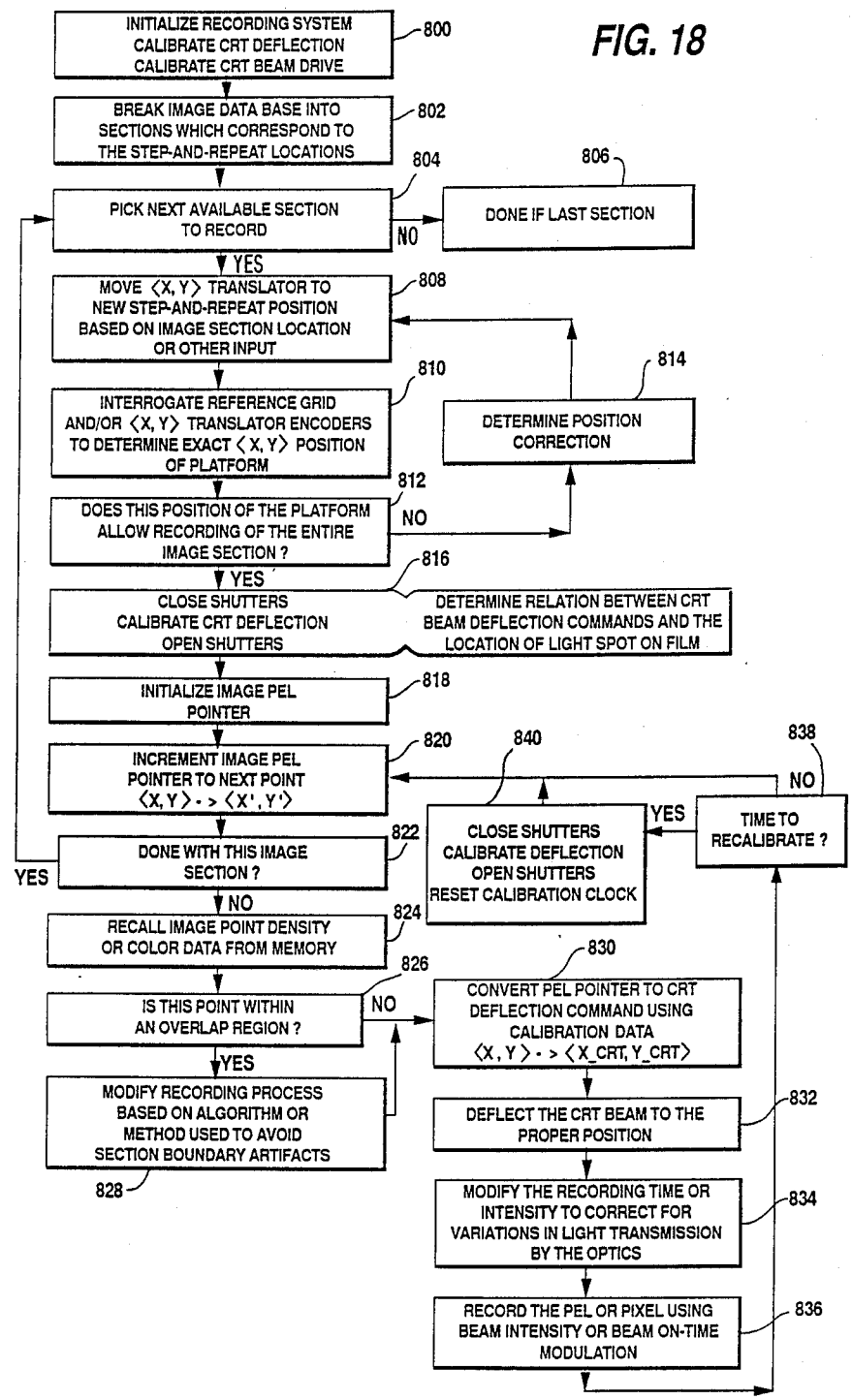
FIG. 18 is a flow chart of the operation of the embodiment of FIG. 17.

FIG. 18 illustrates a flow chart of the operation of the system of FIG. 17 with it being understood that the flow chart is also applicable to the operation of FIGS. 19–22. Operation commences at point 800 where the system is initialized including calibration of the CRT deflection system and calibration of the CRT beam drive electronics. Operation proceeds to point 802 where the stored image to be recorded is broken into a plurality of sections which correspond to the individual positions which the translator platform 704 is to take sequentially under the control of the TRANSLATOR MOTOR CONTROL SIGNAL(S) outputted to the X,Y axis motors 706 by the controller 13. The operation proceeds to point 804 where the next section to be recorded is identified. If the last section had been recorded, the operation would proceed to point 806 where printing would be complete. Operation proceeds to point 808 where the translator platform 704 is moved to X,Y coordinates commanded by the controller 13 to move the position where the next section is to be recorded. Operation proceeds to point 810 where the position of the translator platform position encoders is interrogated. With respect to the embodiments of FIGS. 19–22 described below, the calibration of the translator platform 704 utilizes a low resolution position encoder and a subsequent optical sensing of position to provide high resolution coordinates of the translator platform 704. With respect to FIG. 17, the high precision encoder would provide the exact location of the translator platform 704. With respect to the embodiments of FIGS. 19–22, the high resolution position of the translator platform 704 is sensed by either usage of a reference pattern described below which is projected onto a photosensor which may be the feedback sensor 718 or usage of a mask sensor as in FIGS. 14A–B and 15 described above. Operation proceeds to point 812 where the position of the translator platform 704 is interrogated to determine if its current position permits the recording of the next section to be recorded. If the answer is "no", operation proceeds to point 814 where the actual position of the translator platform 704 is determined and an appropriate position correction is determined. Operation proceeds from point 814 back to point 808 where the position of the translator platform 704 is corrected pursuant to the position correction which was determined at point 814. If the answer is "yes" at point 812, operation proceeds to point 816 where the shutter 710 is closed in response to the SHUTTER CONTROL SIGNAL and the CRT deflection is calibrated to determine the relative relation between the CRT beam deflection commands and the location of the light spot emitted by the CRT 120 on the film plane assembly 16. The aforementioned calibration would be used for recording each of the PELS which comprise the individual section. Operation proceeds to point 818 where the controller 13 initializes pointing to the first PEL to be printed. Operation proceeds to point 820 where the image PEL pointer is incremented to identify the next PEL to be recorded. Operation proceeds to point 822 where a determination is made if the recording of the next PEL will finish recording of that section. If the answer is "no" at point 822, operation proceeds to point 824 where the image point density, if the image is to be printed in black and white, or color data is recalled from memory if the point is to be printed in color. At point 824 the controller 13 determines the position of the correct color filter 708 to be placed in the optical path 716. Operation proceeds to point 826 where a determination is made if the PEL is in an overlapped region as illustrated in FIG. 12. If the answer is "yes" at point 826, operation proceeds to point 828 where the PEL is modified in accordance with an algorithm to correct for section boundary artifacts. The algorithm may be in accordance with that discussed above or in accordance with other algorithms. If the answer is "no" at point 826 or alternatively processing in accordance with point 828 is completed, operation proceeds to point 830 where the PEL pointer is converted to CRT deflection commands using at least one correction parameter discussed above. Operation proceeds to point 832 where the controller 13 commands the CRT 120 to deflect to the corrected deflection coordinates which cause the exposure of the recording medium to light from the CRT 120 at the desired recording position coordinates. Operation proceeds to point 834 where the controller controls the intensity of the light emitted from the CRT 120 to correct for variations in the light transmission by the optical transmission system. Operation proceeds to point 836 where the PEL is exposed on the recording medium in accordance with the corrected intensity at point 834. Operation proceeds to point 838 where a determination is made if it is time to recalibrate the deflection system. If the answer is "no" at point 838, operation proceeds back to point 820 as previously described. If the answer is "yes" at point 838, operation proceeds to point 840 where the shutter 710 is closed to recalibrate the deflection system. It should be noted that in the aforementioned loop, the calibration of the deflection system may be accomplished for areas that are smaller or larger than a section which is printed at each precise location of the translator table or on an individual PEL basis.

It should be noted that the translator platform position for the printing of each section is determined so that the image source can record in areas which exceed that necessary to record the current image section. By this it is meant that the translator platform 704 is positioned so that there is overlap in coverage between adjacent image sections. This overlap is beneficial in at least two ways. First, it eliminates the need to position the translator platform 704 precisely. Although the position of the translator platform 704 during recording must be measured precisely, small errors in the exact position of the translator platform relative to the desired position can be corrected by moving the image on the image source. This relaxation in the accuracy required in the actual locating of the translator platform 704 can significantly reduce the cost of the translator mechanism. Second, the overlap region allows for the provision of measures to reduce the visual effect of residual errors in image placement which might appear at the joint between sections and detract from the image quality.

Figure 19:
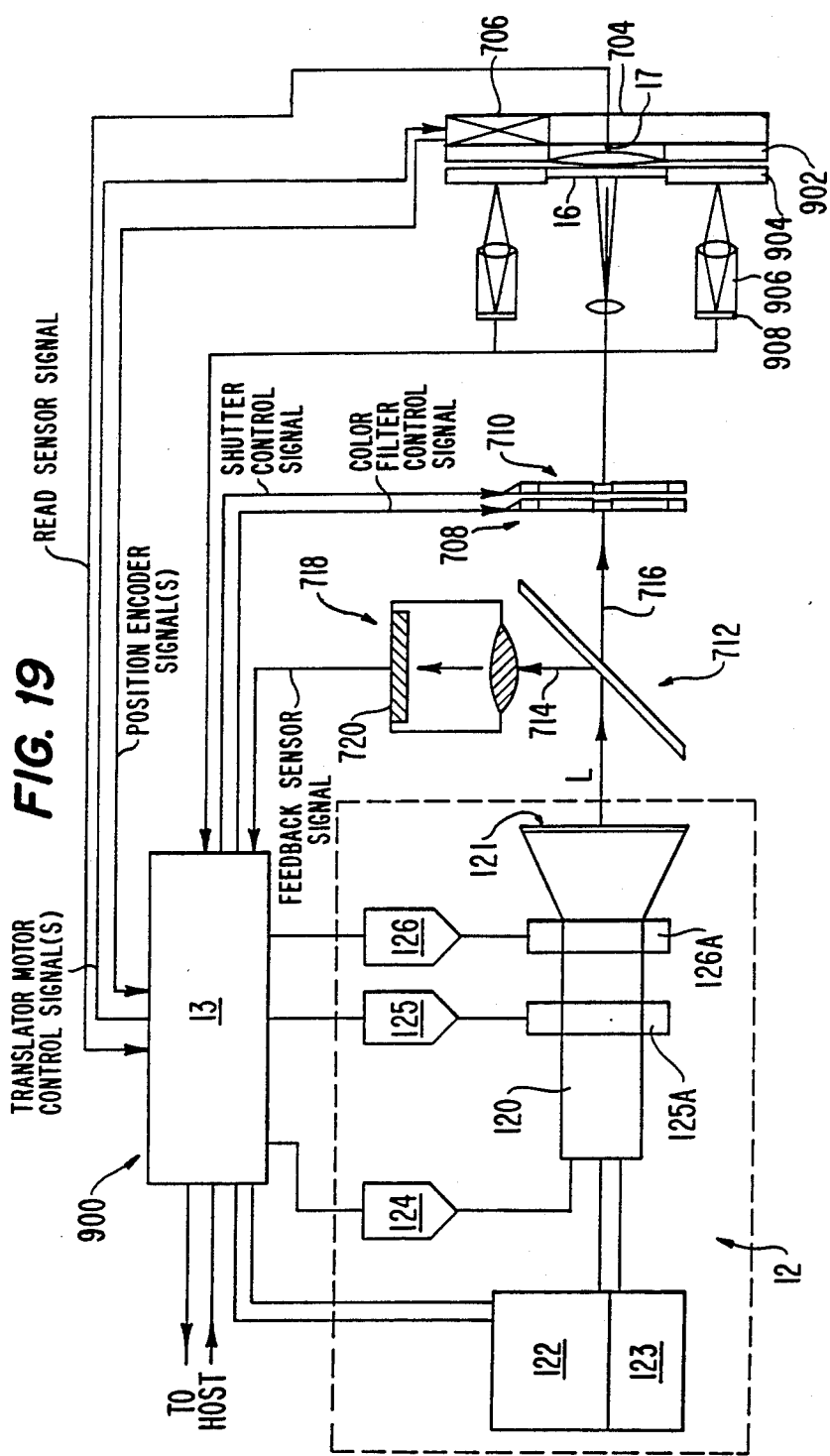
FIG. 19 illustrates a third embodiment of a recording/reading system of the present invention.

FIG. 19 illustrates a third embodiment 900 of the present invention. Like reference numerals identify like parts. The overall operation of the embodiment 900 of FIG. 19 is identical to that of FIG. 17 with the exception that the detection of the position of the translator platform 704 has been modified to reduce the cost by eliminating high accuracy position encoders associated with the motors 706. A pair of back light sources 902 illuminate a pair of reference grids 904 which contain a reference grid which may be formed by a plurality of straight lines which intersect orthogonally to form a cartesian coordinate type pattern. The reference grid pattern is projected by a projection system 906 on a pair of photosensor arrays 908, which each photosensitive location being coupled to the controller 13. The overall assembly of lights 902, grids 904, film plane assembly 16 and read sensor 17 is mounted on the translator platform 704. The reference grid constitutes an image of a Cartesian coordinate graph. The projection of the Cartesian coordinate graph on the sensors 908 permits the controller to precisely locate the position of the translator platform 704 by use, of suitable routine which does not form part of the present invention.

The grid image can be interpreted to yield the position of the grid relative to the grid sensor. This data can be further interpreted to provide the location of the recording medium relative to the image source, which is one objective of the calibration procedure. This is possible because the recording medium bears a fixed position relative to the reference grid, while the image source bears a fixed position relative to the reference grid sensor. Data describing these relative positions are calibrated at the factory and are available to controller 13.

The grid is located by identifying and measuring the position of the grid lines in the grid image relative to elements of the grid sensor. This is accomplished using a standard pattern recognition technique wherein the grid image is mathematically convolved with a known template image. In one embodiment the template is the image of perpendicular intersecting lines, equivalent to the origin of a Cartesian coordinate graph. Mathematically, peaks in the convolution data identify regions of the image which graphically resemble the template. Consequently, the position of regions of the grid image which resemble the origin of a Cartesian coordinate graph would be identified by controller 13 as peaks in the convolution data. In this way the position of the origin of the grid image could be automatically measured.

The image sensor may comprise a small charge coupled device (CCD) or a photodiode array. Since the reference grids 904 are attached to the translator platform 704, the controller 13 may process the images from the individual grids by viewing only a small part of the reference grid at a particular point in time such as a single grid intersection which appears like a cross. The controller 13 processes the aforementioned information to determine the precise location of the translator platform 704 within the low resolution parameters provided by low resolution position detector associated with the translator platform. The use of two reference grids 904 and associated reference grid sensors 908 permits the angle of the translator platform 704 with respect to a coordinate system to be discriminated. The use of the reference grid and optical grid sensor provides another means of optical feedback. Here, it is the position of the translator platform 704 rather than the position of the CRT light spot which is measured. As illustrated, movement of the translator 702 is up and down and in and out with respect to the plane of FIG. 19.

Figure 20:
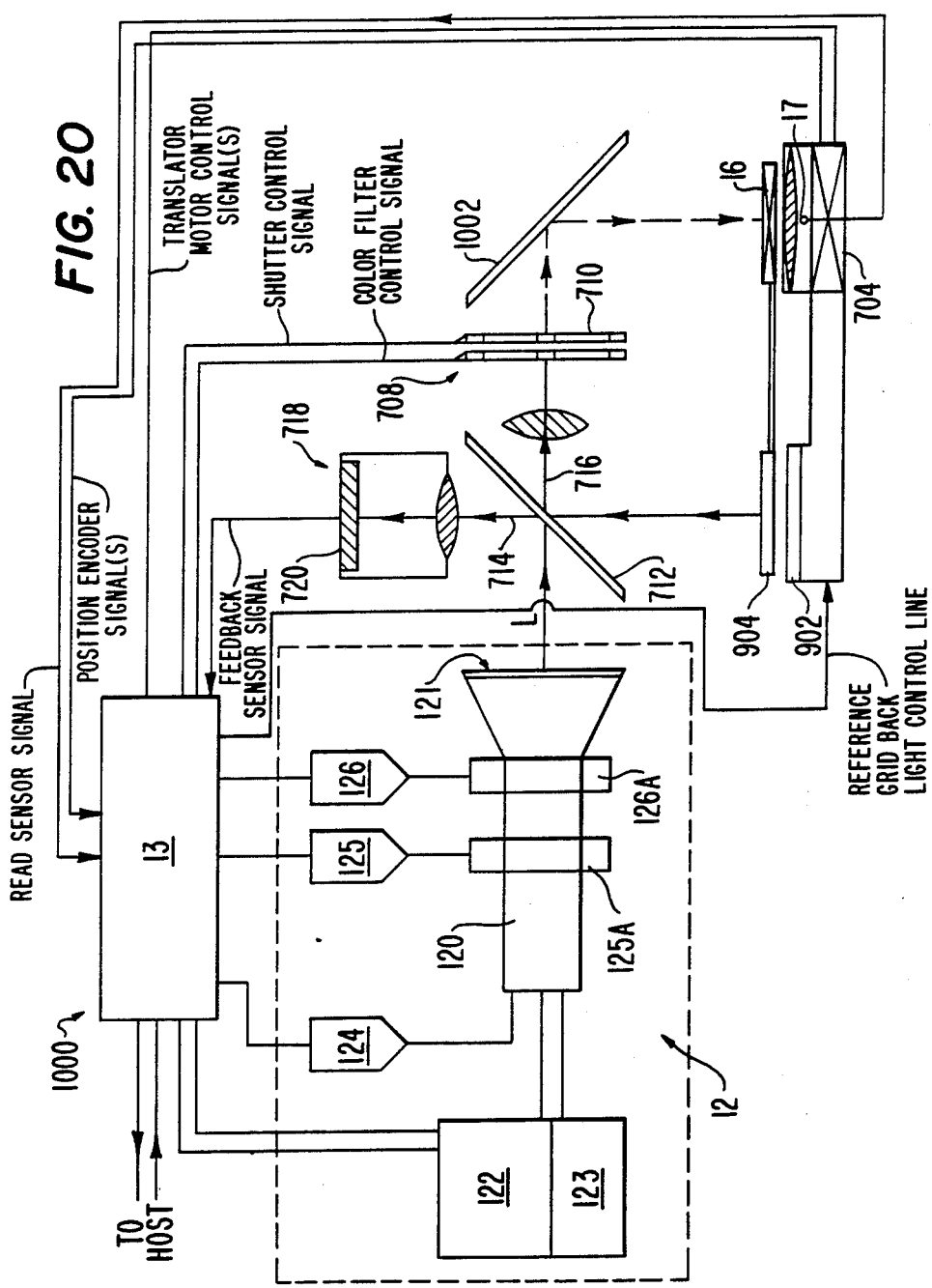
FIG. 20 illustrates a fourth embodiment of a recording/reading system of the present invention.

FIG. 20 illustrates a fourth embodiment 1000 of the present invention. Like reference numerals identify like parts. The embodiment of FIG. 20 differs from FIG. 19 in that the feedback sensor 718 functions both in the calibration of the deflection system of the CRT 120 and further in the high resolution calibration of the position of the translator platform 704. The position of the reference grid 904 is sensed and interpreted by controller 13 during the high resolution calibration of the position of the translator platform 704 after the low resolution position has been read by the controller 13 by the lower resolution encoder associated with the translator motors 706. Light 902 provides illumination of the reference grid upon demand under control of the REFERENCE GRID BACKLIGHT, CONTROL LINE. As illustrated, the beam 716, which passes through the color filter and shutters 708 and 718 respectively, is reflected to the film plane assembly 16 by mirror 1002. The dual usage of the feedback sensor 718 for purposes of calibrating the position of the deflection system and the translator platform 704 further reduces the overall cost of the embodiment of FIG. 20 in comparison to the earlier embodiments in which separate photosensitive sensors are used for sensing the position of the translator platform 700 and the deflection system. The calibration of the deflection system with the feedback sensor is identical to the embodiments of FIGS. 7, 17, and 19. As illustrated movement of the translator 702 is in and out and right and left with respect to the plane of FIG. 20.

Figure 21:
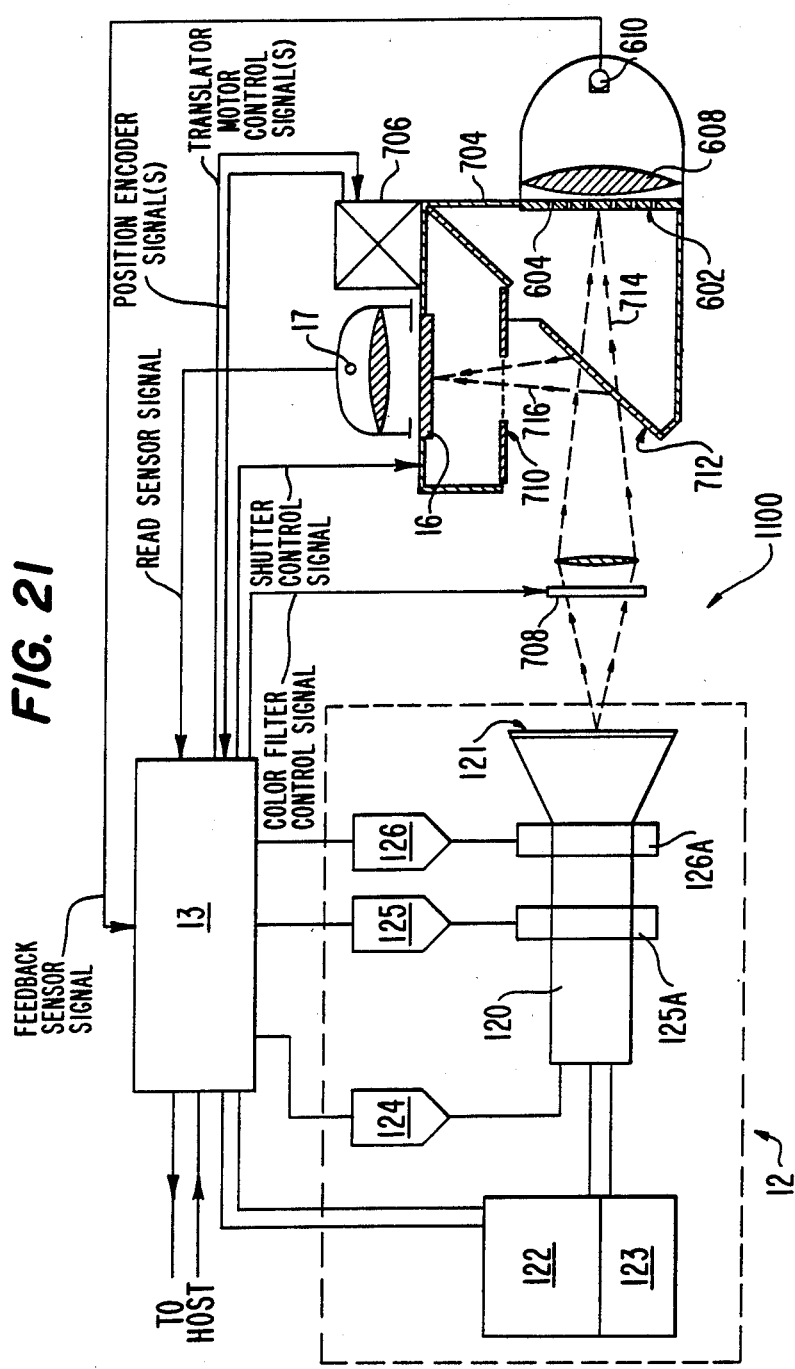
FIG. 21 illustrates a fifth embodiment of a recording/reading system of the present invention.

FIG. 21 illustrates a fourth embodiment 1100 of the present invention. Like reference numerals identify like parts. The fourth embodiment 1100 has the film plane assembly 16 and translator platform 704 position sensor 602 contained in planes which are orthogonal to each other. A rigid mounting platform 704 maintains the film plane assembly 16 and the position sensor 602 at a predetermined relationship which may be accurately mapped at the factory for calibration purposes. The position sensor is identical to that illustrated in FIGS. 13A and B. The position sensor 602 utilizes the mask 604 to generate output signal from the photosensitive element 610 to provide the controller 13 with an accurate position signal after a position encoder associated with the translator motors 706, which produces low resolution position coordinates, has been read by the controller 13. The position of the light emitted from the CRT faceplate 121 is varied through the search pattern described above with reference to FIGS. 14A and B in order to image the light through on of the apertures 604 to permit accurate positioning. It should be noted that the filter 708 and shutter 710 have been illustrated only schematically with it being understood that they may be identical to the structures illustrated previously in FIGS. 17, 19, and 20. One advantage of this embodiment is that the feedback sensor system 602, and especially the feedback sensor mask 604, are located in an equivalent optical plane to the recording medium. This optical equivalence is provided by beam splitter 712, and by the location of both the recording medium plane and sensor plane at the focal plane of the projection lens. In this configuration, calibration data provided by the optical feedback system does not have to be transformed to recording medium coordinates, as in previous embodiments. Note that in this embodiment beam splitter 712 is fixed to the translating platform 704 and moves with the recording medium and feedback sensor system. As illustrated movement of the translation 702 is up and down and in and out with respect to the plane of FIG. 21.

Figure 22:
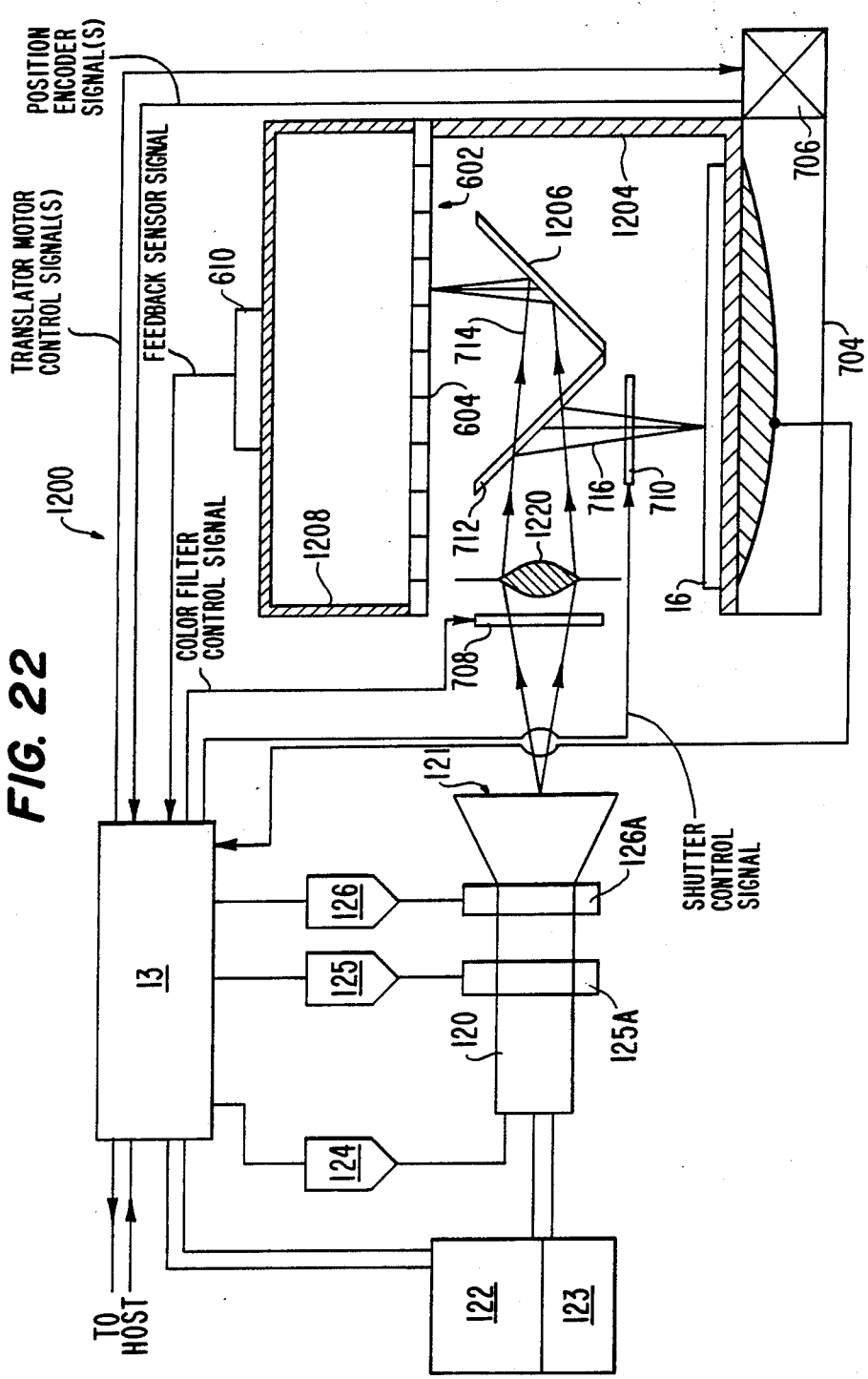
FIG. 22 illustrates a sixth embodiment of a recording/reading system of the present invention.

FIG. 22 illustrates a fifth embodiment 1200 of the present invention. The fifth embodiment 1200 differs from the fourth embodiment 1100 of FIG. 21 in that the film plane and the plane of the mask 602 are held parallel to each other by a rigid mounting structure 1204. Like reference numerals identify like parts. The spatial relationship of the mask 602, and particularly the mask apertures 604, and the film plane assembly 16 are precisely mapped at the factory. A first beam splitter 712 splits the light beam into beam 714 which is redirected by mirror 1206 onto the surface of the mask 602 and beam 716 which is directed to the film plane assembly 16. The mask 602 performs the dual function of calibration of the deflection system as described above and further the high resolution calibration of the position translator platform 704 after the low resolution position encoders associated with the platform 704 or translator motors 706 have been read by the controller 13 as described above at different times. One advantage of this embodiment is that beam splitter 712 is smaller than in previous embodiments, and does not grow in scale as recording medium size is increased. The effect is provided by the mounting of beam splitter 712 and mirror 1206 on the same fixture as image source 121 and the projection lens 122. As illustrated movement of the translator 702 is in and out and right and left with respect to the plane of FIG. 22.

A two level calibration is also used in the embodiment of the invention shown in FIG. 22. In FIG. 22 three sources of information exist to provide for accurate positioning of the light spot on the recording medium. These are the translator platform position encoders, the residual calibration of the CRT deflection system, and the response of the optical feedback system. These sources of information are used, during a calibration procedure, to collect data which is used to evaluate correction parameters for correctly locating the light spot on the recording medium. As described above, these correction parameters can be determined by controller 13 if the controller is provided with a number representative data pairs relating positions on the light source to positions on the recording medium. As described above, the collection of these data pairs begins as a light spot on image source 120 is moved to a position where an image of the spot falls onto aperture 604 of the mask sensor 602. The position of each aperture 604 relative to the recording medium coordinate system is calibrated at the factory, and the calibration data is available to controller 13. Absent any further information, it is impossible to determine from the photosensor 610 response the identify of the aperture 604 through which light passed, and therefore controller 13 can not determine which set of aperture calibration data to recall. This ambiguity in aperture identity is resolved by information supplied by the translator position encoders and by the residual calibration of the CRT deflection system, in much the same way as described above with reference to FIG. 1. By design, apertures 604 are purposely spaced and located so that the low precision information provided by the CRT deflection and translator encoders (in this embodiment) is sufficient to resolve the aperture identity. In the simplest case, the aperture 604 is identified as that particular aperture which lies closest to the estimated position of the light spot on mask sensor 602. This estimated position is determined using the approximate translator encoder coordinates and CRT deflection coordinates, and by general calibration information, known to controller 13, describing the design of the printing system, such as the nominal position of the CRT image source relative to the origin of the translator system, the orientation of the translator axes, etc. Supplied with the aperture identity, controller 13 can recall the appropriate calibration data describing the position of the aperture, which in this embodiment are stored directly as recording medium coordinates. These recording medium coordinates and the CRT beam position coordinates are paired, stored and later interpreted by controller 13 to yield a deflection system calibration, as described previously.

Although the present invention has been described with reference to preferred embodiments, it should be understood that numerous modifications may be made to the invention without departing from the scope of the invention. It is therefore intended that the invention not be limited to the particular embodiments as disclosed herein for practicing the invention and includes all embodiments covered within the scope of the claims.

I claim:

1. An apparatus for recording an image onto a light recording medium by sequentially recording a plurality of sections onto the light recording medium which constitute the image comprising:

a light source which emits light at a position which is movable over a light emitting area of the light source controlled by a controller, the position of the light being subject to deviation from a desired position on the light emitting area of the light source which corresponds to a position to be recorded on the recording medium which has recording position coordinates;

a translator having controllable positions for moving the recording medium relative to a light source during the recording of the plurality of sections of the image;

a light transmitting medium disposed between the light source and the recording medium for transmitting the light from the light source to the recording medium;

a light position sensor having a target area optically coupled to light emitted from a plurality of positions within the light emitting area of the light source used for recording for detecting the position of the light intersecting the target area of the sensor from the light emitting area of the light source and generating at least one signal dependent upon the light intersecting the target area; and wherein the controller, responsive to the at least one signal, produces at least one correction parameter, sequentially controls the recording of the sections to record the image by controlling the position of the light on the light emitting area of the light source as a function of the at least one correction parameter during the recording of each section to cause the light to move to coordinates on the light emitting area of the light source to cause the light to intersect the recording medium at the recording position coordinates and controls the position of the translator for the recording of each section.

2. An apparatus in accordance with claim 1 wherein: the controller produces a plurality of correction parameters, each correction parameter being used during the recording of at least one area within the image.

3. An apparatus in accordance with claim 2 wherein: the correction parameters are sequentially produced by the controller with each sequentially produced correction parameter being used during recording of a different area 4. An apparatus in accordance with claim 3 wherein: the correction parameters are produced by an algorithm which processes calculated coordinates of a plurality of points produced in response to the at least one signal and corresponding recording position coordinates.

5. An apparatus in accordance with claim 2 further comprising:
a calibration system associated with the translator for providing the controller with a position signal representing a position of the translator and wherein;
the controller, in response to the position signal, determines if the translator is positioned to permit recording of a next section to be recorded and if the translator is not positioned to permit recording of the next section causes a position command to be transmitted to the translator to cause the translator to move to a position to permit recording of the next section.

6. An apparatus in accordance with claim 5 wherein: at least one correction parameter is produced after the translator has been positioned to record the next section, the produced correction parameter being used for recording at least one area within the image.

7. An apparatus in accordance with claim 5 wherein: each area of the at least one area to be recorded is equal to a section.

8. An apparatus in accordance with claim 5 further comprising:
a position encoder associated with the translator for providing the controller with position coordinates of the translator with a first level of resolution; and wherein
the recording medium and a reference pattern are mounted on the translator;
a light source projects the reference pattern on the light position sensor to cause the light position sensor to output signals in response to the reference pattern intersecting the light position sensor; and
the controller determines coordinates of the position of the translator with a second higher level of resolution than the first level of resolution in response to the position coordinates outputted by the light position sensor and a position of the light on the light emitting surface of the light source.

9. An apparatus in accordance with claim 8 further comprising:
a shutter which is selectively opened in response to a control signal generated by the controller prior to the light source generating the light to intersect the recording position coordinates;
a beam splitter disposed in an optical path of light emitted from the light source, light in a first path from the optical path intersecting the beam splitter intersecting the light position sensor to cause the generation of the signal dependent upon the light intersecting the target area, light in a second path from the optical path intersecting the beam splitter intersecting the shutter, passing through the shutter and intersecting the recording medium to record the recording medium; and
the reference pattern passing through the beam splitter to the light position sensor to cause the position sensor to output the signal in response to the reference pattern intersecting the position sensor.

10. An apparatus in accordance with claim 9 further comprising:
a color filter carrying a plurality of color filters which are positionable in one of the optical path and first path under control of a color filter position signal; and
the controller generates the color filter position signal to cause a particular color filter to be positioned prior to light intersecting the print position coordinates.

11. An apparatus in accordance with claim 5 wherein:
the light source projects light along an optical path intersecting the recording medium; and further comprising;
a shutter disposed within the optical path between the light source and the recording medium which is selectively opened in response to a control signal;
the controller generates the control signal to cause the shutter to open prior to the light source generating the light to intersect the recording position coordinates; and
a beam splitter disposed in the optical path for splitting light in the optical path into two parts and causing the parts to respectively continue to the recording medium and to the target surface of the light position sensor.

12. An apparatus in accordance with claim 11 further comprising:
a color filter carrying a plurality of color filters which are positionable in the optical path under control of a color filter position signal; and
the controller generates a color filter position signal to cause a particular color filter to be positioned to intersect the light which is to intersect the recording position coordinates.

13. An apparatus in accordance with claim 5 further comprising:
a position encoder associated with the translator for providing the controller with position coordinates of the translator with a first level of resolution;
at least one reference pattern mounted on the translator;
a light source for projecting each reference pattern onto an associated photosensitive sensor, each photosensitive sensor producing an output signal in response to the projection of the reference pattern onto the photosensitive sensor; and wherein
the controller determines coordinates of the position of the translator with a second higher level of resolution than the first level of resolution in response to the position coordinates from at least one photosensitive sensor and a position of the light on the light emitting surface of the light source.

14. An apparatus in accordance with claim 13 wherein:

two reference patterns are projected onto two photosensitive sensors.

15. An apparatus in accordance with claim 1 wherein: the light position sensor and translator do not jointly move.

16. An apparatus in accordance with claim 15 wherein the light position sensor comprises:
a mask having a plurality of apertures with the mask being the target area of the light position sensor; and
at least one photosensitive element disposed at a location spaced from a back surface of the mask for producing a signal indicative of light intersecting one of the at least one photosensitive element which has been emitted from the light source and which is the signal dependent upon the position of the light intersecting the target area.

17. An apparatus in accordance with claim 16 wherein:
when the light source produces light to generate the at least one correction parameter and the light does not intersect the photosensitive element, the controller causes the light emitted from the light source to be moved across the surface area of the light source to cause the light to pass through an aperture to intersect one photosensitive element and the controller determines coordinates of a position of the light in intersecting the mask as a function of signals applied to the light source to cause the intersection of the light on the one photosensitive element.

18. An apparatus in accordance with claim 15 wherein the light position sensor comprises:
a plurality of lenses disposed in an array with each of the lenses of the array being positioned to intercept light emanating from a different section of the area of the light source; and
an array of photosensitive elements optically coupled to the plurality of lenses, each of the plurality of lenses of the array having a focal area which permits the light to fall on all of the photosensitive elements of the target area which may be resolved into coordinates.

19. An apparatus in accordance with claim 15 further comprising:
a position encoder associated with the translator for providing the controller with position coordinates of the translator with a first level of resolution; and
the controller determines coordinates of the position of the translator with a second higher level of resolution than the first level of resolution in response to the position coordinates outputted by the light position sensor and a position of the light on the light emitting area of the light source.

20. An apparatus in accordance with claim 1 wherein: the light position sensor and the translator move jointly with a relative position of the sensor and translator being fixed during movement.

21. An apparatus in accordance with claim 20 wherein the light position sensor comprises:
a plurality of lenses disposed in an array with each of the lenses of the array being positioned to intercept light emanating from a different section of the area of the light source; and
an array of photosensitive elements optically coupled to the plurality of lenses, each of the plurality of lenses of the array having a focal area which permits the light to fall on all of the photosensitive elements of the target area which may be resolved into coordinates.

22. An apparatus in accordance with claim 20 further comprising:
a chamber containing a mask as an exterior surface of the chamber with light only entering the chamber through the apertures of the mask, interior walls of the chamber transmitting light entering the chamber through the apertures; and wherein
at least one photosensitive element is within the chamber and produces the signal indicative of light intersecting the target area when light enters the chamber through one of the apertures and strikes one photosensitive element.

23. An apparatus in accordance with claim 22 further comprising:
a reflecting mirror disposed with respect to a first beam splitter to reflect light which intersects the mask from a path leaving the beam splitter to the mask.

24. An apparatus in accordance with claim 23 wherein:
the recording medium and mask are disposed in parallel planes.

25. An apparatus in accordance with claim 24 wherein:
when the light source produces light to generate at least one correction parameter and the light does not intersect the at least one photosensitive element, the controller causes the light emitted from the light to be moved across the light emitting area of the light source to cause the light to pass through an aperture and intersect one photosensitive element and the controller determines coordinates of a position of the light in intersecting the mask as a function of signals applied to the light source to cause the intersection of the light on the one photosensitive element.

26. An apparatus in accordance with claim 25 wherein:
the movement of the light across the light emitting area is repeated a plurality of times to cause light emitted from the light source to pass through a plurality of different apertures with the at least one correction parameter being generated in response signals produced by light passing through a plurality of apertures.

27. An apparatus in accordance with claim 20 further comprising:
a position encoder associated with the translator for providing the controller with position coordinates of the translator with a first level of resolution; and
the controller determines coordinates of the position of the translator with a second higher level of resolution than the first level of resolution in response to the position coordinates outputted by the light position sensor and a position of the light on the light emitting area of the light source.

28. An apparatus in accordance with claim 20 further comprising:
a mount having first and second surfaces disposed in intersecting planes, the first surface holding the recording medium and the second surface being a target area of the light position sensor, the translator being connected to the mount;
the light source projecting light along an optical path; and a first beam splitter disposed in the optical path for splitting light in the optical path into two parts and causing the parts to respectively intersect the recording medium and target area of the light position sensor.

29. An apparatus in accordance with claim 28 wherein the light position sensor comprises:
   a mask having a plurality of apertures with the mask being the target area of the light position sensor; and
   a photosensitive element disposed at a location spaced from a back surface of the mask for producing a signal indicative of light intersecting the photosensitive element which has been emitted from the light source and which is the signal dependent upon the position of the light intersecting the target area.

30. An apparatus in accordance with claim 29 wherein:
   when the light source produces light used for generating the at least one correction parameter and the light does not intersect the photosensitive element, the controller causes the light emitted from the light source to be moved across the light emitting area of the light source to cause the light to pass through an aperture and intersect the photosensitive element and the controller determines coordinates of the light in intersecting the mask as a function of signals applied to the light source to cause the intersection of the light on the photosensitive element.

31. An apparatus in accordance with claim 30 wherein:
   the movement of the light across the light emitting area is repeated a plurality of times to cause light emitted from the light source to pass through at least one different aperture with a connection parameter being generated in response signals produced by light passing through the plurality of apertures.

32. An apparatus in accordance with claim 29 wherein:
   a lens is disposed between the back surface of the mask and the photosensitive element for focusing light passing through apertures on the photosensitive element.

33. An apparatus in accordance with claim 29 wherein:
   the recording medium and mask are disposed in orthogonal planes.

34. An apparatus in accordance with claim 1 wherein the light transmitting device comprises:
   a shutter disposed within an optical path between the light source and the recording medium which is selectively opened in response to a control signal; and
   the controller generates the control signal to cause the shutter to open prior to the light source generating the light to intersect the recording position coordinates.

35. An apparatus in accordance with claim 34 wherein the light transmitting device further comprises:
   a color filter carrying a plurality of color filters which are positionable in the optical path under control of a color filter position signal; and
   the controller generates the color filter position signal to cause a particular color filter to be positioned in the optical path prior to the light source generating the light to intersect the recording position coordinates.

36. An apparatus in accordance with claim 1 wherein the light transmitting device comprises:
   a bundle of optical fibers coupling light emitted from the light source to the recording medium.

37. An apparatus in accordance with claim 36 wherein:
   a plurality of fibers of the bundle are respectively coupled to a plurality of different positions on the light emitting area of the light source and to the light position sensor; and
   light from the light source intersecting the individual fibers coupled to the light position sensor causes the generation of the at least one signal.

38. An apparatus in accordance with claim 1 wherein the light position sensor comprises:
   a mask having a plurality of apertures with the mask being the target area of the light position sensor; and
   at least one photosensitive element disposed at a location spaced from a back surface of the mask for producing a signal indicative of light intersecting one photosensitive element which has been emitted from the light source and which is the signal dependent upon the position of the light intersecting the target area.

39. An apparatus in accordance with claim 38 when the light position sensor further comprises:
   a chamber containing the mask as an exterior surface of the chamber with light only entering the chamber through the apertures of the mask, interior walls of the chamber transmitting light entering the chamber through the apertures; and wherein
   the at least one photosensitive element is within the chamber and produces the signal indicative of light intersecting one photosensitive element when light enters the chamber through one of the apertures and strikes the one photosensitive element.

40. An apparatus for recording an image on a light recording medium comprising:
   a light source which emits light at a position which is moveable over an area of the light source controlled by a controller, the position of the light being subject to deviation from a desired position on the area of the light source which corresponds to a recording position to be recorded on the recording medium which has recording position coordinates;
   a light transmitting device, disposed between the light source and the recording medium, for transmitting the light from the image source to the recording medium;
   a light position sensor having a target area optically coupled to light emitted from a plurality of positions within the area of the light source used for recording for detecting the position of the light intersecting the target area of the sensor from the area of the light source and generating at least one signal dependent upon the position of the light intersecting the target area, the light position sensor having a mask having a plurality of apertures which are the target area of the light position sensor;
   at least one photosensitive element disposed at a location spaced from a back surface of the mask for producing a signal indicative of light intersecting one of the at least one photosensitive element which has been emitted from the light source and which is the signal dependent upon the position of the light intersecting the target area; and wherein the controller, responsive to the signal, produces at least one correction parameter and controls the position of the light on the area of the light source as a function of the at least correction parameter to cause the light to move to coordinates on the area of the light source to cause the light to intersect the recording medium at the recording position coordinates.

41. An apparatus in accordance with claim 40 wherein:

the light transmitting device further comprises an array of lenses and associated shutters which selectively permit passage of light through each individual lens of the array of lenses.

42. An apparatus in accordance with claim 41 wherein:

when the light source produces light to generate the at least one correction parameter and the light does not intersect the photosensitive element, the controller causes the light emitted from the light source to be moved across the surface area of the light source to cause the light to pass through an aperture to intersect one photosensitive element and the controller determines coordinates of a position of the light in intersecting the mask as a function of signals applied to the light source to cause the intersection of the light with the one photosensitive element.

43. An apparatus in accordance with claim 40 wherein:

when the light source produces light to generate the at least one correction parameter and the light does not intersect the photosensitive element, the controller causes the light emitted from the light source to be moved across the surface area of the light source to cause the light to pass through an aperture to intersect one photosensitive element and the controller determines coordinates of a position of the light in intersecting the mask as a function of signals applied to the light source to cause the intersection of the light with the one photosensitive element.

44. An apparatus for reading an image recorded on a light recording medium by sequentially reading a plurality of recorded sections of the light recording medium which constitute the image comprising:

a light source which emits light at a position which is movable over a light emitting area of the light source controlled by a controller, the position of the light being subject to deviation from a desired position on the light emitting area of the light source which corresponds to a recorded section which has been recorded on the recording medium which has recorded position coordinates;

a translator having controllable positions for moving the recorded medium relative to a light source during the recording of the plurality of sections of the image;

a light transmitting medium disposed between the light source and the recording medium for transmitting the light from the light source to the recording medium;

a light position sensor having a target area optically coupled to light emitted from a plurality of positions within the light emitting area of the light source used for reading for detecting the position of the light intersecting the target area of the sensor from the light emitting area of the light source and generating at least one signal dependent upon the light intersecting the target area;

a reading sensor positioned for being optically coupled to light from the light source for sensing light intersecting the recorded medium; and wherein the controller, responsive to the signal, produces at least one correction parameter, sequentially controls the reading of recorded sections by controlling the position of the light on the light emitting area of the light source as a function of at least one correction parameter during the reading of each section to cause the light to move to coordinates on the light emitting area of the light source to cause the light to intersect the recorded medium at the recorded position coordinates and controls the position of the translator for the reading of each section.

* * * * *